US011122049B2

(12) United States Patent
Mathew et al.

(10) Patent No.: US 11,122,049 B2
(45) Date of Patent: Sep. 14, 2021

(54) ATTRIBUTE DATABASE SYSTEM AND METHOD

(71) Applicant: Visa International Service Association, San Francisco, CA (US)

(72) Inventors: Sachin Cherian Mathew, Singapore (SG); Shi Kai Khiew, Singapore (SG); Xue Du, Singapore (SG); Axel Johannes André Debrand, Manly (AU); Hancong Kong, Singapore (SG); Niraj Jitendra Doshi, Singapore (SG); Weiwen Ng, Singapore (SG); Ying Teo, Singapore (SG)

(73) Assignee: Visa International Service Association, San Francisco, CA (US)

( * ) Notice: Subject to any disclaimer, the term of this patent is extended or adjusted under 35 U.S.C. 154(b) by 391 days.

(21) Appl. No.: 16/282,812

(22) Filed: Feb. 22, 2019

(65) Prior Publication Data

US 2020/0274876 A1    Aug. 27, 2020

(51) Int. Cl.
| | |
|---|---|
| *H04L 29/06* | (2006.01) |
| *G06F 21/62* | (2013.01) |
| *G06F 16/242* | (2019.01) |
| *H04L 29/08* | (2006.01) |
| *G06F 21/60* | (2013.01) |

(52) U.S. Cl.
CPC ........ *H04L 63/102* (2013.01); *G06F 16/2425* (2019.01); *G06F 21/604* (2013.01); *G06F 21/6218* (2013.01); *H04L 63/0892* (2013.01); *H04L 67/306* (2013.01); *G06F 2221/2141* (2013.01)

(58) Field of Classification Search
CPC . H04L 63/102; H04L 63/0892; H04L 67/306; H04L 63/0407; H04L 63/105; H04L 63/101; G06F 21/6218; G06F 16/2425; G06F 21/604; G06F 2221/2141; G06F 16/242
See application file for complete search history.

(56) References Cited

U.S. PATENT DOCUMENTS

| | | | |
|---|---|---|---|
| 10,255,419 B1 * | 4/2019 | Kragh | ................. H04L 63/0823 |
| 2004/0123162 A1 * | 6/2004 | Antell | ..................... H04L 63/08 |
| | | | 726/5 |
| 2004/0128378 A1 * | 7/2004 | Blakley, III | ............ G06F 21/41 |
| | | | 709/224 |

(Continued)

*Primary Examiner* — Darren B Schwartz
(74) *Attorney, Agent, or Firm* — Kilpatrick Townsend & Stockton LLP

(57) ABSTRACT

A method is disclosed. The method includes receiving, by a server computer from a resource provider computer, interaction data comprising a user identifier, a resource provider identifier, and a resource identifier. The interaction data is associated with an interaction between a resource provider and a user. The server computer can then determine a set of attribute types specifically associated with the resource provider identifier and the resource identifier. The server can then determine a set of user attributes associated with the set of attribute types using the user identifier. The server computer can then execute a query comprising one or more questions on the set of user attributes to determine if the one or more questions are satisfied. Next, if the one or more questions are satisfied, then the server computer can perform additional processing associated with the interaction.

16 Claims, 15 Drawing Sheets

(56) References Cited

U.S. PATENT DOCUMENTS

| | | | |
|---|---|---|---|
| 2004/0128546 A1* | 7/2004 | Blakley, III | G06F 21/6245 726/8 |
| 2005/0138110 A1* | 6/2005 | Redlich | G06F 21/6209 709/201 |
| 2005/0193093 A1* | 9/2005 | Mathew | G06Q 30/02 709/219 |
| 2006/0191995 A1* | 8/2006 | Stewart | G06Q 20/40 235/379 |
| 2008/0015927 A1* | 1/2008 | Ramirez | G06Q 30/02 705/7.29 |
| 2008/0086759 A1* | 4/2008 | Colson | G06Q 30/06 726/2 |
| 2010/0123003 A1* | 5/2010 | Olson | G06Q 20/3574 235/380 |
| 2010/0162359 A1* | 6/2010 | Casey | H04L 67/22 726/3 |
| 2011/0029620 A1* | 2/2011 | Bonforte | H04L 67/10 709/206 |
| 2013/0055357 A1* | 2/2013 | Etchegoyen | G06F 21/34 726/4 |
| 2013/0125211 A1* | 5/2013 | Cashman | G06F 21/6218 726/4 |
| 2013/0191898 A1* | 7/2013 | Kraft | G06F 21/31 726/6 |
| 2013/0311224 A1* | 11/2013 | Heroux | G06Q 90/00 705/7.15 |
| 2014/0230032 A1* | 8/2014 | Duncan | G06F 21/32 726/7 |
| 2014/0331278 A1* | 11/2014 | Tkachev | H04L 63/08 726/1 |
| 2015/0128240 A1* | 5/2015 | Richards | H04L 63/0861 726/7 |
| 2016/0292441 A1* | 10/2016 | Stuntebeck | G06F 21/6218 |
| 2018/0183735 A1* | 6/2018 | Naydonov | G06N 3/006 |

* cited by examiner

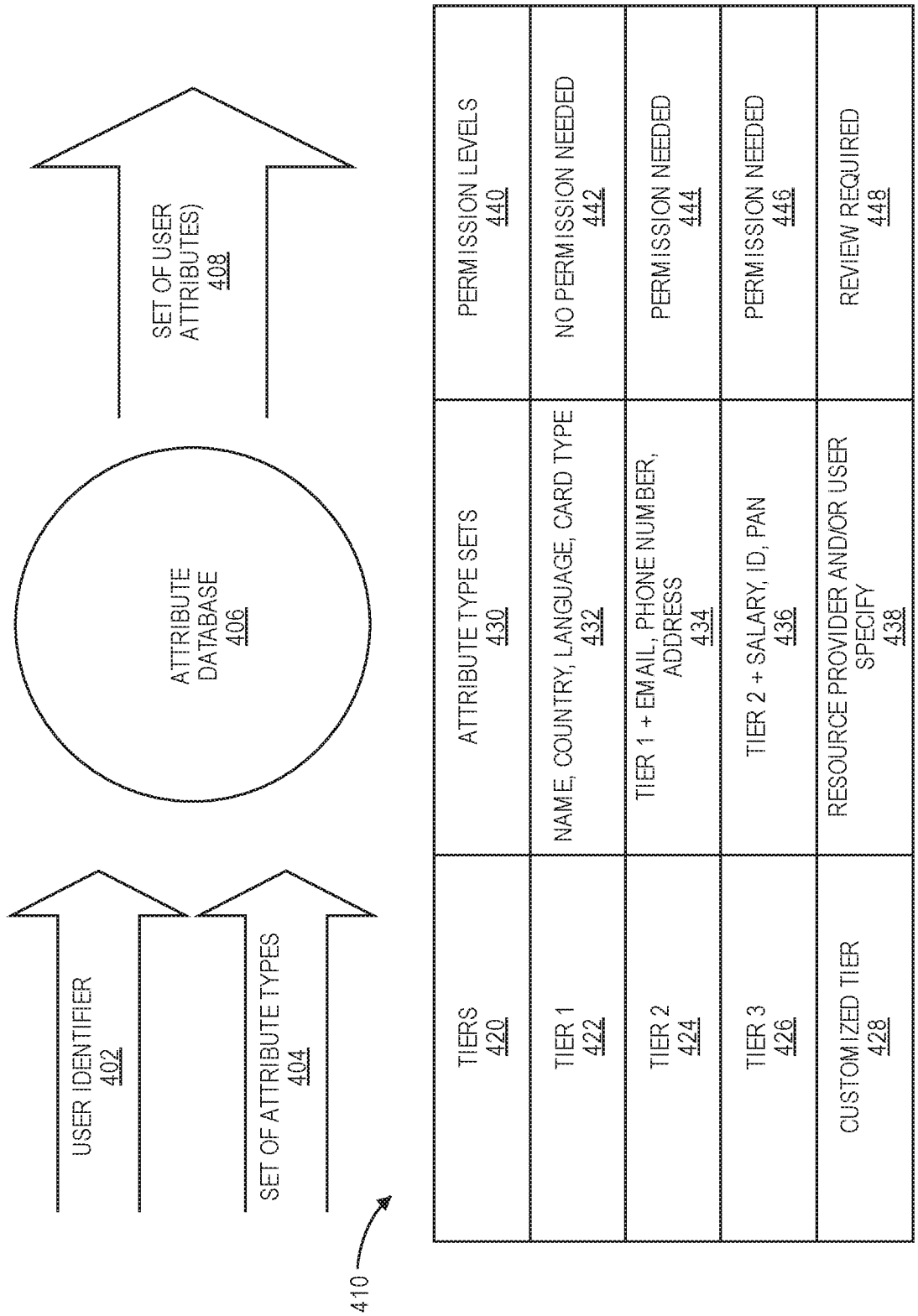

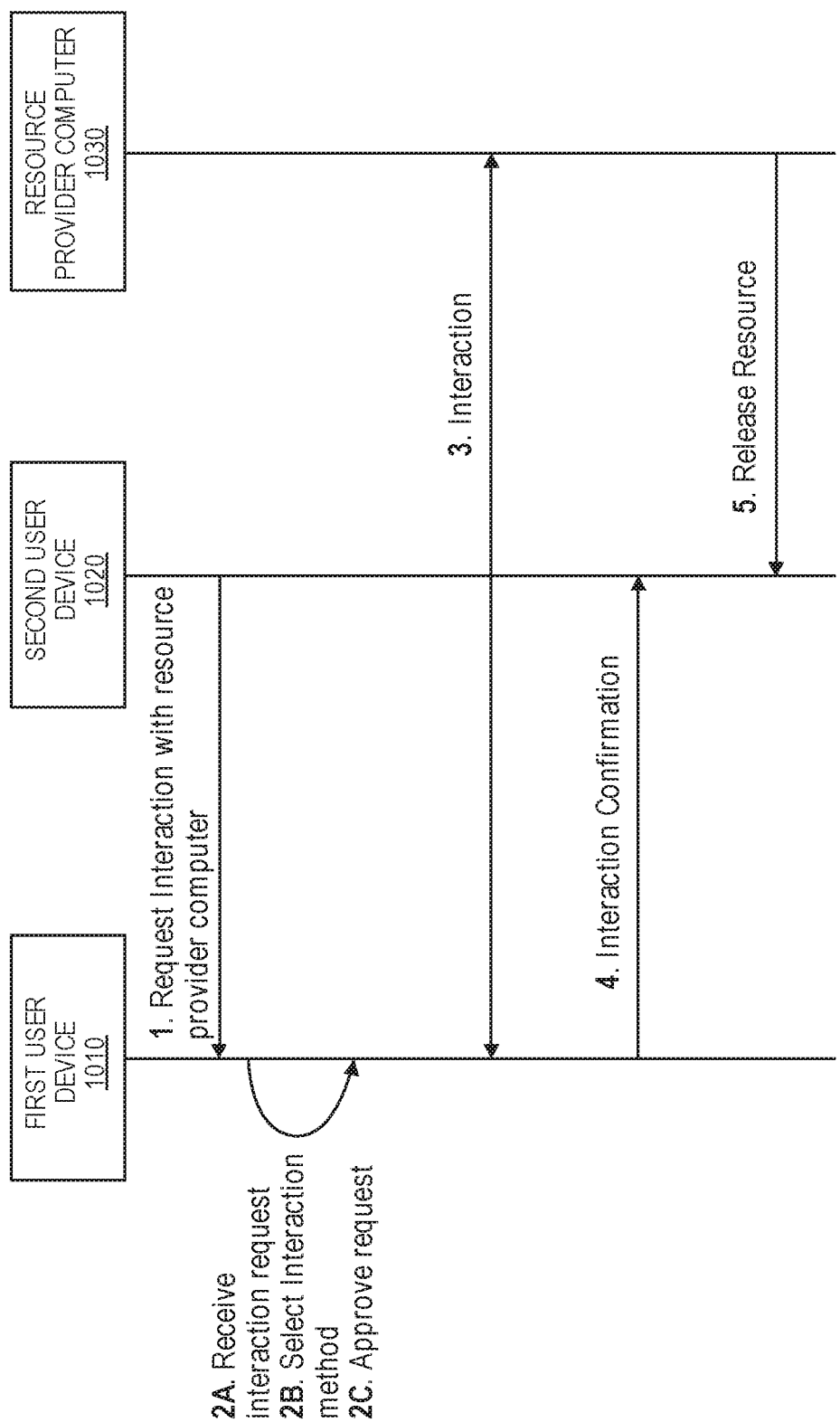

ATTRIBUTE DATABASE SYSTEM AND METHOD

BACKGROUND

Currently, when a user requests keycard access to a secure location (e.g., a house), a location access entity can request a report of the user including user information from a third party (e.g., a central information repository). The location access entity may only need a proof of residence (e.g., utility bill with address and the user's name) from the third party. However, the location access entity may receive a full report including extraneous information (e.g., phone number, email address, etc.) regarding the user. Similarly, the user may request keycard access to an employer's location from the location access entity. In this case, the location access entity may also receive the full report even though the location access entity may only need a proof of employment (e.g., paystub, etc.). Even though the user is requesting access to different types of locations, the location access entity can receive a full report of information about the user.

Furthermore, when a user requests a loan for a house from an entity, such as a bank, the bank may request the user's full credit history from a third party (e.g., a credit bureau) in order to determine whether or not to grant the loan. Likewise, the user can request a loan for a new computer from an entity, such as a merchant. The merchant, similar to the bank, can request the user's full credit history from the credit bureau. The bank, when receiving a request for the house loan, may need different information than the merchant, when receiving a request for the computer loan. However, the bank and the merchant both receive the user's full credit history.

The proliferation of the user's information (e.g., full credit history) can be problematic. As the user's information is made available to more entities, the information becomes more susceptible to a data breach. For example, the merchant that offers loans for new computers may not have as strict of data privacy and/or encryption techniques as the credit bureau.

Embodiments of the invention address this problem and other problems individually and collectively.

SUMMARY

Embodiments of the invention may be related to methods and systems for creating and utilizing a global identity. Embodiments may also be related to methods and systems of performing and processing interactions between users and resource providers. Embodiments may also provide a mechanism for limiting user attributes provided to a resource provider.

One embodiment is related to a method comprising: receiving, by a server computer from a resource provider computer, interaction data comprising a user identifier, a resource provider identifier, and a resource identifier, wherein the interaction data is associated with an interaction between a resource provider and a user; determining, by the server computer, a set of attribute types specifically associated with the resource provider identifier and the resource identifier; determining, by the server computer and using the user identifier, a set of user attributes associated with the set of attribute types; executing, by the server computer, a query comprising one or more questions on the set of user attributes to determine if the one or more questions are satisfied; and if the one or more questions are satisfied, then performing additional processing associated with the interaction.

Another embodiment is related to a server computer comprising: a processor; a memory device; and a computer-readable medium coupled to the processor, the computer-readable medium comprising code executable by the processor for implementing a method comprising: receiving, from a resource provider computer, interaction data comprising a user identifier, a resource provider identifier, and a resource identifier, wherein the interaction data is associated with an interaction between a resource provider and a user; determining a set of attribute types specifically associated with the resource provider identifier and the resource identifier; determining, using the user identifier, a set of user attributes associated with the set of attribute types; executing a query comprising one or more questions on the set of user attributes to determine if the one or more questions are satisfied; and if the one or more questions are satisfied, then performing additional processing associated with the interaction.

One embodiment is related to a method comprising: receiving, by a resource provider computer, a resource identifier and a user identifier from a user device during an interaction between a resource provider and a user; generating, by the resource provider computer, interaction data comprising the resource identifier, the user identifier, and a resource provider identifier associated with the resource provider; transmitting, by the resource provider computer, the interaction data to a server computer; receiving, by the resource provider computer, an authorization response message from the resource provider computer; and transmitting, by the resource provider computer, an authorization notification regarding whether or not the interaction was authorized to the user device.

Further details regarding embodiments of the invention can be found in the Detailed Description and the Figures.

BRIEF DESCRIPTION OF THE DRAWINGS

FIG. 4 shows a block diagram illustrating an attribute database according to embodiments of the invention.

FIG. 10 shows a flow diagram illustrating a proxy interaction process according to embodiments of the invention.

DETAILED DESCRIPTION

Figure 1:
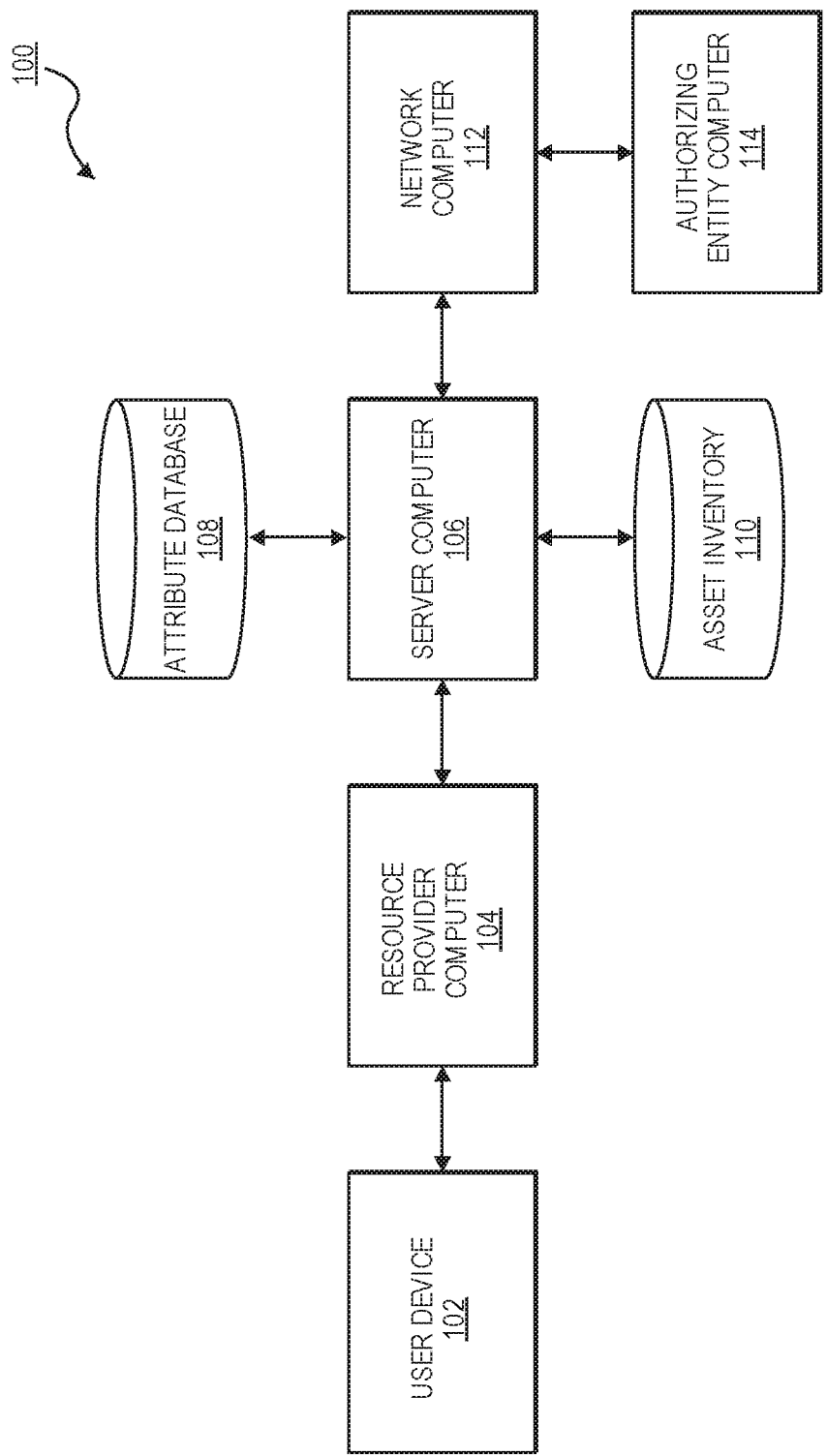
FIG. 1 shows a block diagram of a system illustrating a global identity system according to embodiments of the invention.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like.

A "resource provider" may be an entity that can provide a resource such as goods, services, information, and/or access. Examples of resource providers include merchants, data providers, transit agencies, governmental entities, venue and dwelling operators, etc. A "merchant" may typically be an entity that engages in transactions and can sell goods or services, or provide access to goods or services.

An "asset" or "resource" can include goods and/or services. In some embodiments, a user can acquire assets via interactions. A list of the user's assets can be stored in an asset inventory.

An "attribute" can include a quality, feature, and/or piece of information that may represent a property of something.

"Attribute types" can include types of attributes. For example, types of attributes can include a name, a physical address, an email address, a passport number, a driver's license number, a phone number, a salary, a country, a card type, a PAN, and/or any other suitable type of attribute that can represent information regarding an entity such as a user.

"User attributes" can include a specific attribute of a user. A user can be associated with a plurality of user attributes. For example, a user attribute can be "John Doe" which can correspond to the attribute type of name.

A "permission level" can include a level of permission. Examples of permission levels can include "no permission needed," "require user confirmation," "custom user confirmation," etc. A permission level can be associated with a tier of attribute types. For example, a first tier can include the attribute types of "name," "country," "language," and "card type." The first tier may be associated with a permission level of, for example, "no permission needed."

A "query" may include one or more questions. The one or more questions may be questions related to user attributes. In some embodiments, the one or more questions can be privacy preserving questions. A server computer can execute a query to determine answer(s) to the question(s). For example, a query may include the question of "is the user older than 21 years of age?" As another example, a query may include the question of "what is the user's salary, if the user's salary is between $50,000 and $100,000 per year?"

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234." In some embodiments, credentials may be considered sensitive information.

An "authorization request message" may be an electronic message that requests authorization for an interaction. In some embodiments, it is sent to a network computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a network computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the network computer) to the merchant's access device (e.g., point-of-sale (POS) equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may include a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include a device that processes something. In some embodiments, a process can include any suitable data computation device or devices.

A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

I. Systems

Embodiments may relate to various interaction systems, e.g., document access system, building access system, payment systems, and the like. Although examples of building access systems as well as payment systems are described, embodiments are equally applicable for other authorization systems.

A. Overview

FIG. 1 shows a block diagram of a system 100 comprising a number of components according to some embodiments of the invention. The system 100 comprises a user device 102, a resource provider computer 104, a server computer 106, an attribute database 108, an asset inventory 110, a network computer 112, and an authorizing entity computer 114.

The user device 102 can be in operative communication with the resource provider computer 104. The resource provider computer 104 can be in operative communication with the server computer 106. The server computer 106 can be in operative communication with a number of databases, such as the attribute database 108 and the asset inventory 110. The server computer 106 can also be in operative communication with the network computer 112, which can be in operative communication with the authorizing entity computer 114.

Message between the entities, providers, networks, and devices illustrated in FIG. 1 may be transmitted using a secure communications protocols such as, but not limited to, File Transfer Protocol (FTP), HyperText Transfer Protocol (HTTP), Secure Hypertext Transfer Protocol (HTTPS), Secure Socket Layer (SSL), ISO (e.g., ISO 8583), and/or the like. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); Wi-Fi™; a wireless network (e.g., employing protocols such as, but not limited to a Wireless Application Protocol (WAP), I-mode, and/or the like); and/or the like.

The user device 102 can include any suitable device and can be operated by a user. For example, the user device 102 can include a mobile device configured to communicate with a resource provider computer 104. For example, in some embodiments, the user may request resource(s) from a resource provider using the user device 102. User device 102 can interact with an access device at a resource provider location associated with resource provider computer 104. For example, the user may tap the user device 102 against a near-field communication (NFC) reader in the access device. Alternatively, the user may indicate interaction details to the resource provider computer 104 over a computer network, such as in an online or e-commerce transaction.

Each resource offered by the resource provider computer 104 can be associated with a resource identifier. The user can select resource(s) associated with resource identifier(s). The resource identifier can include any suitable identifier and can comprise alphanumeric characters. For example, the resource identifier can be "728AZ," "meal2," "data7," etc.

The user of the user device 102 can be associated with a user identifier. The user identifier can include any suitable identifier and can comprise alphanumeric characters. After the user selects a resource, the user device 102 can transmit the user identifier along with the selected resource identifier to the resource provider computer 104.

The resource provider computer 104 can be operated by the resource provider. The resource provider computer 104 can receive the selected resource identifier as well as the user identifier from the user device 102. The resource provider computer 104 can then determine interaction data. The interaction data can include the user identifier, the resource identifier, and a resource provider identifier. The resource provider computer 104 can transmit the interaction data to the server computer 106. The resource provider identifier can include any suitable identifier that may identify the resource provider. In some embodiments, the resource provider computer 104 can determine the resource provider identifier. In other embodiments, the server computer 106 can generate the resource provider identifier.

The server computer 106 can receive the interaction data from the resource provider computer 104 at any suitable time, for example, during an interaction between the user device 102 and the resource provider computer 104. The server computer 106 can determine a set of attribute types specifically associated with the resource provider identifier and the resource identifier.

The server computer 106 can also determine, using the user identifier, a set of user attributes associated with the set of attribute types. The set of user attributes may be retrieved from the attribute database 108. Each resource identifier can also be associated with one or more queries. A query can comprise one or more questions. In some embodiments, the one or more questions can be privacy preserving questions. The server computer 106 can execute a query to determine answer(s) to the question(s). For example, a query may be "is the user younger than 21 years of age?" As another example, a query may be "has the user's passport expired?" The server computer 106 can execute the query comprising one or more questions on the set of user attributes to determine if the one or more questions are satisfied. In some embodiments, a query may limit the amount of data provided to the resource provider computer 104.

The server computer 106 can also be configured to perform additional processing associated with the interaction if the one or more questions are satisfied. For example, additional processing can include generating an authorization request message for the interaction and transmitting the same to the authorizing entity computer 114 via the network computer 112.

The attribute database 108 can store user attributes. The attribute database 108 may aggregate user attributes over time and may store any suitable number of user attributes. The attribute database 108 may store user attributes corresponding to a plurality of users.

The asset inventory 110 can store lists of assets. The asset inventory 110 can store a list of assets for each user. The list of assets can include virtual assets as well as digital representations of physical assets. For example, a virtual asset can be an access code to access a secure location. A physical asset may be, for example, a card, a car, etc. A digital representation of the car may include a data item comprising a license plate number, a make, a model, etc. The user may acquire a resource after an interaction. The acquired resource may be included in the list of assets stored in the asset inventory 110.

The attribute database 108 and the asset inventory 110 may be a conventional, fault tolerant, relational, scalable, secure database such as those commercially available from Oracle™ or Sybase™.

The network computer 112 may route or switch messages between a number of server computers including the server computer 106, and a number of authorizing entity computers including the authorizing entity computer 114. The network computer 112 may be a processing network computer in some embodiments. The processing network computer may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing network computer may forward an authorization request received from a transport computer to the authorizing entity computer via a communication channel. The processing network computer may further forward an authorization response message received from the authorizing entity computer to a transport computer and/or the server computer 106.

The authorizing entity computer 114 may be configured to authorize any suitable request, including access to data, access to a location, and/or approval for a payment. In some embodiments, the authorizing entity computer 114 may be operated by an account issuer. Typically, the issuer is an entity (e.g., a bank) that issues and maintains an account of a user. The account may be a credit, debit, prepaid, or any other type of account.

B. Resource Provider Computer

Figure 2:
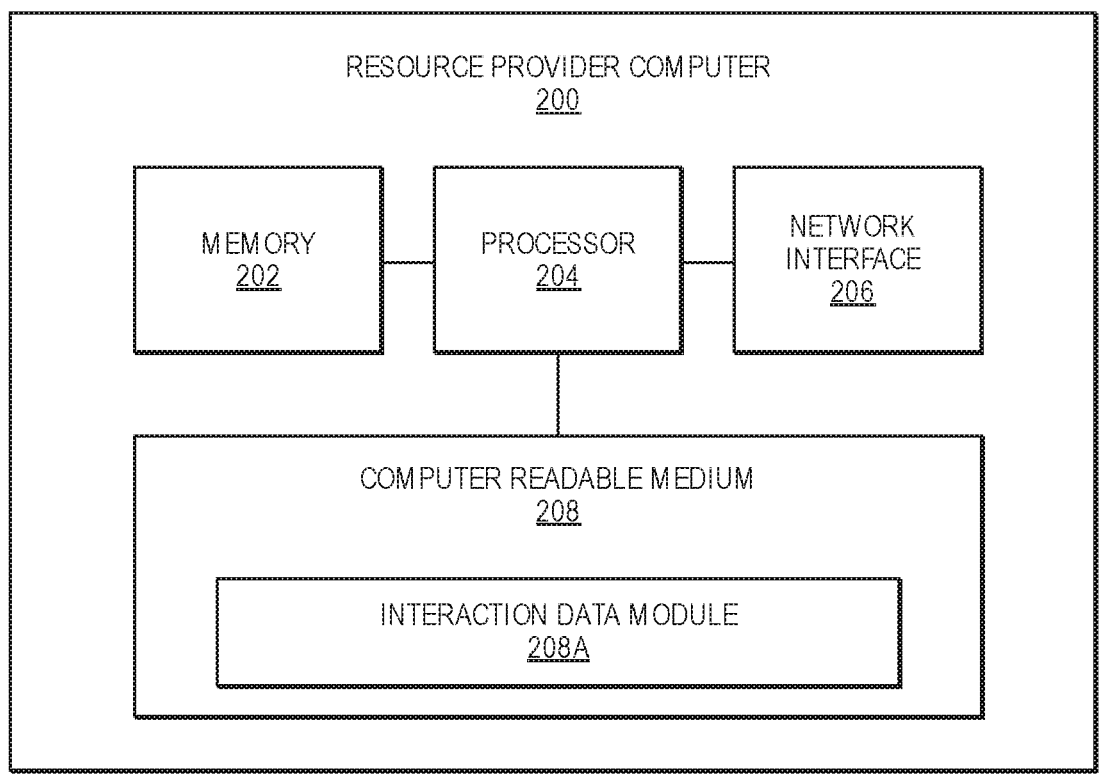
FIG. 2 shows a block diagram illustrating a resource provider computer according to embodiments of the invention.

FIG. 2 shows a block diagram of a resource provider computer 200 according to some embodiments of the invention. The exemplary resource provider computer 200 may comprise a processor 204. The processor 204 may be coupled to a memory 202, a network interface 206, and a non-transitory computer readable medium 208 comprising an interaction data module 208A.

The memory 202 may be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The network interface 206 may include an interface that can allow the resource provider computer 200 to communicate with external computers. The network interface 206 may enable the resource provider computer 200 to communicate data to and from another device (e.g., a user device, a server computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 208 may comprise code, executable by the processor 204, to implement a method comprising: receiving, by a resource provider computer, a resource identifier and a user identifier from a user device during an interaction between a resource provider and a user; generating, by the resource provider computer, interaction data comprising the resource identifier, the user identifier, and a resource provider identifier associated with the resource provider; transmitting, by the resource provider computer, the interaction data to a server computer; receiving, by the resource provider computer, an authorization response message from the resource provider computer; and transmitting, by the resource provider computer, an authorization notification regarding whether or not the interaction was authorized to the user device.

The interaction data module 208A, in conjunction with the processor 204, can create interaction data. The interaction data module 208A can create interaction data comprising a user identifier, a resource identifier, and a resource provider identifier. The resource provider computer 200 can receive the user identifier and the resource identifier (i.e., a selected resource identifier) from the user device. In some embodiments, the interaction data may comprise additional data, such as resource details. The resource details can be associated with the resource identifier. For example, the resource may be a flight ticket. The resource identifier may be "AF-1025." The resource details may include "date: 10/10/2019," "departure time: 2:00 PM PST," "arrival time: 4:10 PM PST," "departure location: San Francisco International Airport," "arrival location: Seattle-Tacoma International Airport," etc.

C. Server Computer

Figure 3:
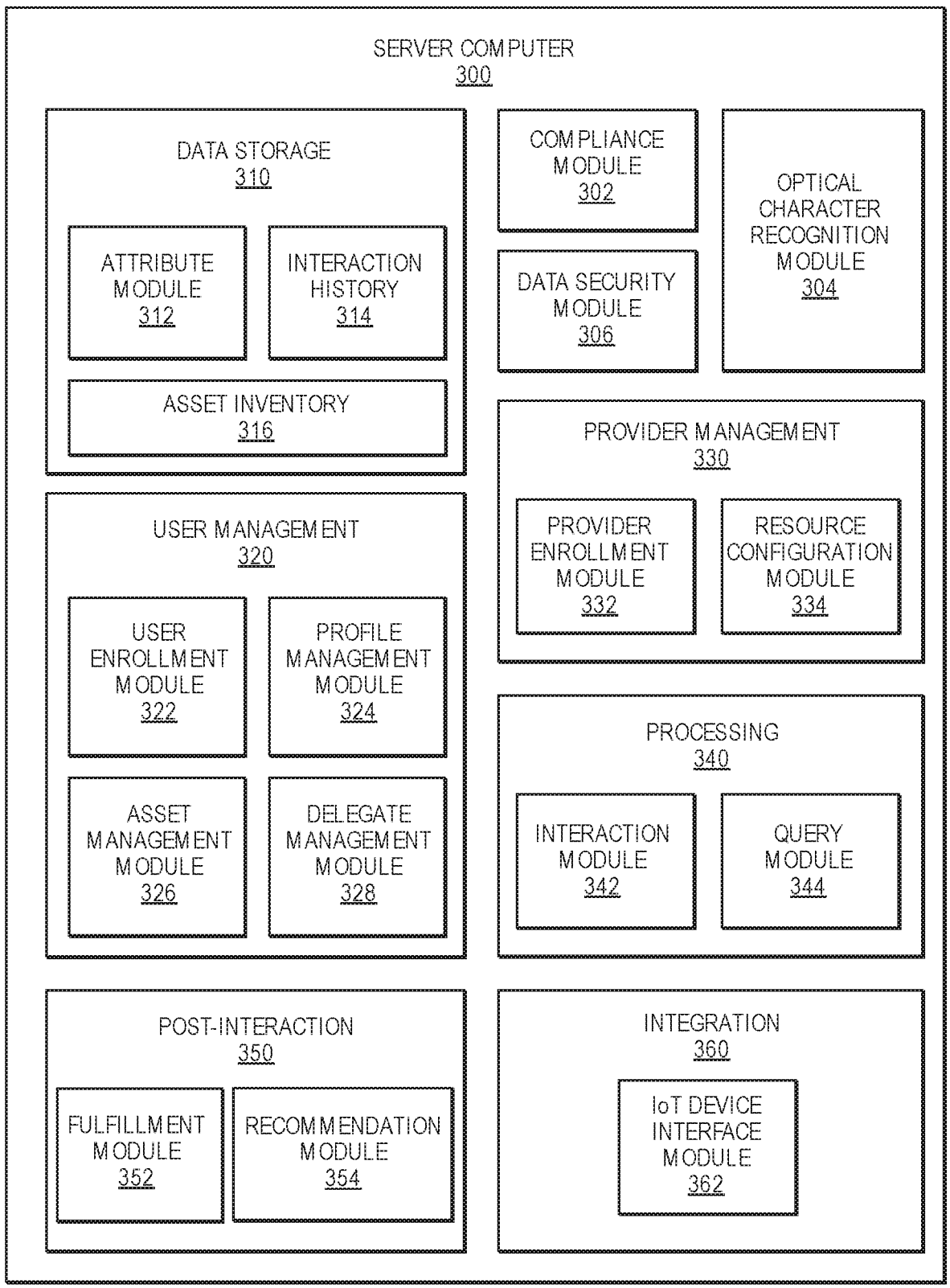
FIG. 3 shows a block diagram illustrating a server computer according to embodiments of the invention.

FIG. 3 shows a block diagram of a server computer 300 according to embodiments of the invention. The exemplary server computer 300 may comprise a processor (not shown). The processor may be coupled to a network interface and a non-transitory computer readable medium comprising a number of modules. The computer readable medium can comprise data storage modules 310, user management modules 320, provider management modules 330, processing modules 340, post-interaction modules 350, and integration modules 360. The computer readable medium can also comprise any other suitable module(s), collectively referred to as common modules.

The network interface of the server computer 300 can be similar to the network interface 206, described herein. The server computer 300 can also comprise any suitable memory. The memory can be similar to the memory 202, described herein.

1. Common Modules

The common modules can include a compliance module 302, an optical character recognition module 304, a data security module 306, and any other suitable module. For example, the common modules can also include communication modules.

The compliance module 302, in conjunction with the processor, can verify compliance rules. The compliance rules can include rules that may verify whether or not local, national, and/or international rules, regulations, and/or laws are being complied with in the current interaction. The compliance module 302 can include a dynamic set of rules. For example, the compliance module 302 can check in which region the user and the resource provider are located, and can ensure that legal and regulatory requirements are met. In some embodiments, administrators can create and/or modify rules in the compliance module 302. User information and resource provider information, as well as an interaction between the entities, can be evaluated based on these rules and flagged in case of any non-compliance.

For example, the compliance module 302 can include compliance rules such as a rule regarding the legal age to purchase tobacco products. In Singapore, the minimum age to buy tobacco products is 21, however, in the United States, the minimum age to buy tobacco products is 18. The compliance module 302 can determine that the user is located in Singapore and is 33 years of age, for example, by the user's location, the user's physical address, the resource provider's location, and/or the like. The compliance module 302 can determine that the current interaction is compliant with legal and regulatory requirements regarding the legal age to purchase tobacco products.

The optical character recognition (OCR) module 304, in conjunction with the processor, can extract information from documents. Documents can include passports, drivers licenses, identification cards, deeds, legal documents, agreements, social security cards, and/or any other suitable documents. Documents may be provided by users and service providers to the server computer 300.

For example, a user can send a photo of a passport to the server computer 300 via a user device. The server computer 300 can perform any suitable OCR with the optical character recognition module 304 to extract characters from the photo of the passport. The optical character recognition module 304 can, for example, determine a passport number, county, expiration date, name(s), and/or any other suitable information from the photo of the passport.

The optical character recognition module 304 can perform electronic conversion of images of typed, handwritten, and/or printed text into machine-encoded text. The optical character recognition module 304 can perform OCR in any suitable method known to one of skill in the art. The optical character recognition module 304 can also perform any of the following pre-processing techniques: de-skew, despeckle, binarisation, line removal, layout analysis, line and word detection, script recognition, segmentation, normalization, etc.

The data security module 306, in conjunction with the processor, can preserve data security. The data security module 306 can utilize any suitable cryptographic techniques. For example, the data security module 306 can encrypt sensitive data using AES256 (Advanced Encryption Standard 256) techniques. The data security module 306 can also manage cryptographic keys using a hardware security module (HSM). In some embodiments, the data security module 306 can also expose a data protection application program interface (API) for other modules to retrieve keys for data encryption and decryption. Each module may be associated with a unique cryptographic key identified by a module identifier.

2. Data Storage Modules

The data storage modules 310 can include an attribute module 312, an interaction history module 314, and an asset inventory module 316. The data storage modules 310 can perform data storage processes.

The attribute module 312, in conjunction with the processor, can retrieve data from and store data to an attribute database, such as the attribute database 108 shown in FIG. 1. The attribute module 312 can be used to securely manage a user's global identity in the attribute database. The user's global identity can comprise a plurality of user attributes.

The attribute module 312 can receive a user identifier and a set of attribute types specifically associated with the resource provider identifier and the resource identifier. The attribute module 312 can then respond with the corresponding user attributes.

In some embodiments, the attribute module 312 can determine which user attributes can be retrieved for a particular user attribute request based on permission levels. Attribute types can be categorized into separate tiers, depending on the sensitivity of the data. Each tier can be associated with a permission level. For example, attribute types in tier 1 such as name, country, and language can be shared with resource providers without additional permission from users. However, explicit permission can be granted by the user to resource providers when they request tier 2 or tier 3 information.

The attribute module 312 can retrieve user attributes from the attribute database. FIG. 4 shows a block diagram illustrating an attribute database 406 according to embodiments of the invention. The attribute module 312 can receive a user identifier 402 and a set of attribute types 404. The attribute module 312 can determine a set of user attributes 408 based on the user identifier 402 and the set of attribute types 404. For example, the attribute module 312 can search the data in the attribute database 406 by user identifier 402. Once the data has been limited by the user identifier 402, the attribute module 312 can determine a set of user attributes 408 associated with the set of attribute types 404. In some embodiments, the permission levels can be stored in a user permissions database along with attribute types. In other embodiments, the permission levels can be stored in the attribute database 406 along with the user attributes. The user permissions database can store a plurality of attribute type sets, each attribute type set being associated with a permission level identified by the user.

FIG. 4 also shows a permission level table 410. The permission level table 410 comprises tiers 420, attribute type sets 430, and permission levels 440. Tier 1 422 can be associated with an attribute type set comprising attribute types of name, country, language, and card type 432 as well as a permission level of no permission needed 442. For example, if the set of attribute types 404 requested by a resource provider computer comprises the attribute types of name and language, the attribute module 312 can determine that the resource provider computer is requesting attributes types associated with tier 1 422, and thus no permission is needed 422 for the resource provider to receive the attribute types of name and language.

Tier 2 424 can be associated with an attribute type set comprising attribute types of tier 1+email, phone number and address 434 as well as a permission level of permission needed 444. For example, if the set of attribute types 404 requested by a resource provider computer comprises the attribute types of name, language, and email, the attribute module 312 can determine that the resource provider computer is requesting attribute types associated with tier 1 422 as well as tier 2 424. The attribute module 312 can determine that the highest tier is tier 2 424, and thus the resource provider needs to comply with the permission level of permission needed 444 for the resource provider to receive the attribute types of name, language, and email.

Tier 3 426 can be associated with an attribute type set comprising attribute types of the tier 2+salary, ID, and PAN as well as a permission level of permission needed 446. For example, if the set of attribute types 404 requested by a resource provider computer comprises the attribute types of name, language, email, and PAN (i.e., primary account number), the attribute module 312 can determine that the resource provider computer is requesting attributes types associated with tier 1 422, tier 2 424, and tier 3 426. The attribute module 312 can determine that the highest tier is tier 3 426, and thus the resource provider needs to comply with the permission level of permission needed 446 for the resource provider to receive the attribute types of name, language, email, and PAN.

A customized tier 428 can be associated with attribute types that the resource provider can specify 438 as well as a permission level of review required 448. The customized tier 428 can be associated with any attribute types and/or permission levels. For example, in some embodiments, the user can select the attribute type of salary to be associated with the customized tier 428. The permission level of review required 448 can be set to any suitable permission level. The attribute module 312 can review the selection of the attribute type(s) and permission level associated with the customized tier 428.

The interaction history module 314, in conjunction with the processor, can retrieve and store interaction history. Interaction data can be stored by the interaction history module 314 in a suitable interaction history database. As users and/or resource providers perform interactions, the interaction history module 314 can store interaction data in the interaction history database. In some embodiments, the interaction history can be analyzed to determine trends and patterns of interactions of a user as well as across different groups of users. The interaction history can include any suitable data associated with the interaction (e.g., interaction data).

The asset inventory module 316, in conjunction with the processor, can maintain an inventory of assets, such as the assets owned by the users. The asset inventory module 316 can utilize structured query language (SQL), NoSQL, and/or blockchain technologies to maintain record(s) of the assets. When a user performs an interaction, such as purchasing a resource from a resource provider, the resource can be added into the asset inventory as the user's asset. The user can view the asset inventory to view a list of assets associated with the user. The stored asset can include data associated with the asset (e.g., resource details).

3. User Management Modules

The user management modules 320 can include a user enrollment module 322, a profile management module 324, an asset management module 326, and a delegate management module 328.

The user enrollment module 322, in conjunction with the processor, can enroll users into a global identity program. The user enrollment module 322 can receive inputs from the user. The user can input user attributes during enrollment. For example, the user can input "name: Jane Doe," "phone number: 415-xxx-xxxx," and "email address: JaneDoe@emailaddress.com." In some embodiments, rather than keying in information, the user can provide images of their national ID and/or other documents to the server computer 300. The optical character recognition module 304 can read and analyze the documents and extract user attributes.

In some embodiments, the user enrollment module 322 may also provide for bulk enrollment which may be utilized by resource provider computers. Bulk enrollment can allow resource provider computers with an existing user information database to migrate user attributes to the attribute database. If a user is enrolled, then asset(s) that are provided by the resource provider computer can be added to the user's asset inventory. If the user is not enrolled, then a new user global identity can be created while notification(s) (e.g., email, SMS, etc.) be sent to the user to validate the information.

The profile management module 324, in conjunction with the processor, can allow a user to manage the user's global identity. After receiving the user attributes, and the completion of enrollment, the user's profile (i.e., global identity) can be stored by the profile management module 324 into the attribute database.

The profile management module 324 can also store permission levels granted by the users to resource providers for the various tiers of data. Once a user grants a resource provider permission to access a particular tier of data, the user may not need to give permission for that resource provider during future interactions.

As an example, during enrollment, the user may decide to not enter a user attribute for the attribute type of phone number. Later, when the user performs an interaction with a resource provider (e.g., booking a flight ticket with an airline), the user can enter their phone number. The profile management module 324 can retrieve the phone number of the user and can add the phone number to the user's global identity stored in the attribute database. In the future, the user may have the option to let other resource providers retrieve the phone number from the attribute database without the user having to input the phone number in each subsequent interaction.

The asset management module 326, in conjunction with the processor, can manage assets. Whenever a user acquires a new asset from a resource provider or otherwise acquires an asset, the asset can be added to the asset inventory as the user's asset. The asset management module 326 can provide for automatic asset insertion to a user's asset inventory based on various criteria such as amount (e.g., >$100, >1 GB, etc.), category (e.g., real estate, data, furniture, cars, gold, flights, etc.), etc. The asset management module 326 can also allow users to register asset(s) previously acquired.

As an example, when a user purchases a car, the car can be automatically registered as the user's asset by the asset management module 326, which may receive resource details from a resource provider computer as described herein in further detail. In some embodiments, credit cards and debit cards can also be registered as user assets.

The delegate management module 328 can delegate management of a first user's asset to a second user. A user may give another user permission to use one or more of their assets using the delegate management module 328. When a second user gets permission to use a first user's asset, the asset can be listed in the asset inventory as a shared asset associated with both the first user and the second user. In some embodiments, the shared asset can include an expiry date. The expiry date can be any suitable expiry date, for example, 30 minutes, 1 hour, 8 hours, 1 day, 2 weeks, 1 year, etc. In some embodiments, the user(s) can select the expiry date via the delegate management module 328. In some embodiments, a user can revoke/cancel permissions that were previously granted to another user.

4. Provider Management Modules

The provider management modules 330 can include a provider enrollment module 332 and a resource configuration module 334. The provider management modules 330 can perform provider management processes.

The provider enrollment module 332, in conjunction with the processor, can enroll resource providers. A resource provider can enroll into a global identity program through the provider enrollment module 332. The provider enrollment module 332 can create a resource provider identifier for the resource provider.

The resource configuration module 334, in conjunction with the processor, can configure resources. After enrollment, details about a resource and the information prerequisites for the resource can be configured by the resource provider computer via the resource configuration module 334. For example, the resource provider may be a gas station with a resource provider identifier of P001. The resource provider computer can input details about the resources (e.g., gasoline, candy, soda, alcohol, etc.) that are available. The resource provider computer can specify that the age of the buyer (e.g., a user attribute with the attribute type of age) is required while purchasing alcohol. As another example, a resource provider that is a flight provider may need to specify additional attribute types such as national identification (e.g., passport) and email.

Different resources from the same resource provider may require different user attributes during an interaction. For example, a resource provider that is a telecom operator may need identification, such as a driver's license when an interaction includes the user requesting a new mobile connection. However, the resource provider may not require user attributes when the interaction includes activating roaming on an existing mobile connection.

As shown below, a resource provider with a resource provider identifier of P001 may need the attribute types of name, mobile number, and age of a user who wants to acquire the resource Pr1. The resource provider can also provide a resource with a resource identifier of Pr2 which may need the attribute type of age. The resource provider P003 may need the attribute type of address for the resource 3abc3.

| Resource Provider Identifier | Resource Identifier | Attribute Type |
| --- | --- | --- |
| P001 | Pr1 | Name |
| P001 | Pr1 | Mobile Number |
| P001 | Pr1 | Age |
| P001 | Pr2 | Age |
| P003 | 3abc3 | Address |

In some embodiments, there may be restrictions in place specifying what kind of attributes can be configured as prerequisite depending on the type or category of the resource provider and/or resource. These restrictions can prevent a resource provider from building comprehensive profiles of each shopper by requesting for more information than is required. While a customer could decline such requests, the restrictions can enhance the user experience as the user doesn't need to decline unnecessary requests. For example, the resource provider might be an Airline company with Merchant Category Code (MCC) of 4511 and the system could prevent the resource provider from configuring any Tier 3 or customized tier information as prerequisite. In some embodiments, an exception could be granted to the resource provider to request attributes that would normally not be allowed. For example, the Airline company may have promotions targeted to the underprivileged and may require Tier 3 information to determine whether or not the user is eligible for the promotion.

In some embodiments, the resource provider also can associate queries that may be created in a query module 344, described herein, to the resources that they are providing. In some embodiments, the queries can be used to determine parameters such as offering type, specific charges, eligibility check, etc.

5. Processing Modules

The processing modules 340 can include an interaction module 342 and a query module 344. The processing modules 340 can, for example, perform processing of an interaction between a user and a resource provider.

The interaction module 342, in conjunction with the processor, can process interactions during the interaction phase. The interaction module 342 can use the resource configuration module 334 to determine which attribute types are requested by the resource provider for a resource identifier associated with the interaction. The interaction module 342 can also determine whether or not any queries associated with the requested attribute types need to be evaluated. The interaction module 342 can request the required attribute types from the profile management module 324 through an exposed API. If a user attribute associated with a requested attribute type is not stored in the attribute database, then the interaction module 342 can request the user to input the missing user attributes. For example, the server computer 300 can transmit a missing attribute request message comprising a set of missing user attributes to the user device. Once the user inputs the missing user attributes, then the profile management module 324 can store the missing user attributes in the attribute database. The compliance module 302 can analyze the interaction and can flag the interaction if there are any problems. If the compliance module 302 does not find a compliance issue, then the interaction module 342 can forward the interaction data and user attributes to the query module 344 where the queries can be executed (if any).

The query module 344, in conjunction with the processor, can perform queries. A query can comprise one or more questions, as described herein. In some embodiments, the one or more questions can be privacy preserving questions. A server computer can execute a query to determine answer(s) to the question(s). For example, a query may be "does the user reside in California?"

A resource provider may not always require details about a user (e.g., user attributes). Sometimes, information derived from user attributes is sufficient for the resource provider. The resource provider can create queries using the resource configuration module 334. A query can be associated with one or more resources. In some embodiments, multiple queries can be associated to a single resource. When the server computer 300 processes an interaction involving a resource, the query module 344 can evaluate the query associated with the resource identifier selected by the user. The query module 344 can maintain privacy as well as provide information to the resource provider on a need-to-know basis.

For example, the query of "does a user reside in California" can limit the amount of data sent to the resource provider computer. The query module 344 can determine if the user attribute of a user associated with the attribute type of address includes a state of "California." The server computer 300 can then provide an answer of "yes" to the resource provider computer rather than providing the full address. In some embodiments, the server computer 300 can provide any suitable number of answers to the questions to the resource provider computer.

As another example, the interaction can be between a user and a resource provider, where the resource provider may be a bank. The interaction can include the user requesting a loan of $800,000. For granting a loan of $800,000, the bank may only need to know whether a user earns more than $200,000 per year (i.e., yes or no) rather than the exact salary of the user. A query that determines whether or not the user earns more than $200,000 per year can be associated with the resource of "loan." The query module 344 can perform the query associated with the resource identifier.

When adding new resources via the resource configuration module 334, the resource provider computer can configure one or more questions to be computed each time a service is invoked. The resource provider computer can include dynamic variables in the questions (e.g., age, country, etc.). During an interaction, the questions can be evaluated by the query module 344 by retrieving user attributes using the profile management module 324. Once the queries are executed and the results are determined to be acceptable (e.g., are correct, privacy preserving, etc.), then the server computer 300 can route the interaction a network computer for processing. For example, the server computer 300 can transmit an authorization request message comprising the interaction data to the network computer. In some embodiments, the authorization request message may further comprise user credentials that may be retrieved from the attribute database.

6. Post-Interaction Modules

The post-interaction modules 350 can include a fulfillment module 352 and a recommendation module 354. The post-interaction modules 350 can perform post-interaction processing after the processing modules 340 process the interaction.

The fulfillment module 352, in conjunction with the processor, can perform fulfillment during a post-interaction phase. In some embodiments, the server computer 300 can be configured to process information that is received from the resource provider computer in real time (e.g., as soon as the interaction is completed). The fulfillment module 352 can add assets to the asset inventory as information is received from the resource provider computer. In other embodiments, resource provider computers may send the information in batches to the server computer 300 (e.g., every 8 hours, 12 hours, 1 day, 1 week, etc.). The fulfillment module 352 can process large batches of information from various resource provider computers and can add assets corresponding to the information to the asset inventory.

For example, during an interaction, as described herein, the user can acquire an asset of "access to a secure location." The fulfillment module 352 can receive details associated with the interaction from the interaction module 342 and/or from the resource provider computer after the interaction is completed. For example, the fulfillment module 352 can receive resource details from the resource provider computer. In some embodiments, the fulfillment module 352 may also receive the interaction data from the resource provider computer. The fulfillment module 352 can add the asset of "access to a secure location" to an asset inventory associated with the user. The asset, as stored in the asset inventory, can comprise any suitable information associated with the asset (e.g., location, room number, location code, access start date, access expiry date, and/or the like).

The recommendation module 354, in conjunction with the processor, can generate recommendations. The recommendation module 354 can access the asset inventory as well as user attributes through the profile management module 324 to make resource recommendations and provide information to the resource provider without the user needing to provide user attributes that already exist in the attribute database. In some embodiments, the recommendation module 354 can analyze the interaction history and asset inventory to understand user preferences and simplify the process for a user to buy a new service. For example, the user may book a hotel in Japan. When the user (who usually books business class, as determined by the recommendation module 354) goes to a flight booking website, displayed flights to Japan for the same dates as the hotel booking with available business class seats can be automatically shown to the user. The user can then select the flight.

The recommendation module 352 can further analyze the transaction history and asset-inventory to provide recommendations for new services/products based on items in the asset inventory. For example, if a user wants to go on a holiday, they can purchase flight tickets. The server computer 300 can analyze the user's asset inventory, including the flight ticket, and determine that travel insurance has not yet been purchased for the trip. The recommendation module 354 can then generate a recommendation of travel insurance. Travel insurance for the trip duration can then be recommended to the user, for example, via the user device. The user's relevant user attributes along with the travel region and duration (included in the flight ticket asset) can be automatically provided to the insurance provider.

7. Integration Modules

The integration modules 360 can include an IoT (Internet of things) device interface module 362. The integration modules 360 can provide for further integration between the server computer 300 and other computers, devices, entities, etc.

The IoT device interface module 362, in conjunction with the processor, can include an interface between the server computer 300 and IoT devices. Cars, smart devices, digital assistants, etc. can be linked to the server computer 300 to provide the users seamless access to assets. For example, when a user purchases a smart lock, it can be registered as an asset under that user's assets. There may be no additional steps needed for the user to set up their own pairing of their smart phone and the smart lock. The user can unlock the new smart lock using their user device in communication with the server computer 300.

II. Methods

Some embodiments of the invention are directed to methods. The methods may include processing interactions between users and resource providers. FIGS. 5A-5F show a flowchart of an interaction process according to an embodiment of the invention. The method illustrated in FIG. 5 will be described in the context of a user booking a flight. It is understood, however, that the invention can be applied to other circumstances (e.g., booking a hotel, accessing a secure location, accessing secure data, requesting a data transfer, etc.). Although the steps are illustrated in a specific order, it is understood that embodiments of the invention may include methods that have the steps in different orders. In addition, steps may be omitted or added and may still be within embodiments of the invention.

Prior to step 502, a user can enroll in a global identity program with a server computer. The user can enroll via a user device 580 in communication with the server computer. The user device 580 can transmit enrollment data to the server computer to initiate enrollment. The enrollment data can comprise any suitable data used to enroll the user in the global identity program. For example, enrollment data can comprise user attributes, such as user attributes corresponding to the attribute types of name, phone number, address, and email address. During enrollment, the server computer can assign a user identifier to the user. The user identifier can include any suitable identifier. For example, the user identifier can be a username selected by the user or a randomly generated alphanumeric string of any suitable length.

A resource provider of a resource provider computer 582 can also enroll in the global identity program with the server computer. The resource provider computer 582 can transmit resource data to the server computer. The resource data can comprise resource identifiers as well as attribute types and/or queries associated with the resource identifiers. For example, the resource provider computer 582 can transmit resource data to the server computer comprising information regarding two resources. The resource data can comprise a resource identifier of "00A1" which can be associated with attribute types of "age" and "address," as well as a query of "limit address to state information," as the resource provider computer 582 may only need the user's state rather than full address. The server computer can also comprise a resource identifier of "00A2" which can be associated with attribute types of "email address," "legal name," and "phone number," while not being associated with a query.

The server computer can assign a resource provider identifier to the resource provider. In some embodiments, the resource provider computer 582 can select and/or request a specific resource provider identifier.

The server computer can comprise a number of modules including an interaction module 584, a resource configuration module 586, a profile management module 588, a compliance module 592, a query module 594, as well as an attribute database 590 and an asset inventory 596.

In some embodiments, the server computer can further comprise a recommendation module. The recommendation module can recommend a resource for a user. For example, the user may have previously booked a hotel room. The recommendation module can determine a suitable resource, such as a flight, that may be associated with the previously received resource. If the hotel room is booked for a specified period of time, then the recommended flight(s) may have arrival and departure dates similar to the dates of the hotel room.

At step 502, the user can select a resource identifier associated with a resource. For example, the user device 580 can display a webpage hosted by the server computer. The user can select a resource identifier on the webpage. In some embodiments, the user can select a plurality of resource identifiers. The user device 580 can transmit the resource identifier and the user identifier to the resource provider computer 582. An interaction between the user device 580 and the resource provider computer 582 can be initiated upon transmission of the selected resource identifier and the user identifier.

At step 504, the resource provider computer 582 can receive the resource identifier and the user identifier from the user device 580. The resource provider computer 582 can then determine interaction data. The interaction data can comprise the user identifier, the resource provider identifier, and the resource identifier. In some embodiments, the interaction data can further comprise resource details. The resource details can include any relevant information regarding the resource associated with the resource identifier. The resource provider computer 582 can then transmit interaction data to the server computer.

For example, the resource provider computer 582 can include the user identifier and the resource identifier (received from the user device 580) in the interaction data. The resource provider computer 582 can also include the resource provider identifier in the interaction data. The resource provider identifier can be retrieved from any suitable resource provider computer 582 storage, such as a memory. The resource provider can then determine resource details associated with the resource identifier received from the user device 580. The resource provider computer 582 can retrieve the resource details from a resource details database. For example, the resource identifier, received from the user device 580, can be "00A1." The resource provider computer 582 can query the resource details database for the resource details associated with the resource identifier "00A1." For example, if the resource identifier corresponds to a resource such as a plane ticket, then the resource details can include takeoff and landing times, airline, flight number, etc. The resource provider computer 582 can then include the resource details in the interaction data.

In some embodiments, the interaction data can include a plurality of resource identifiers as well as resource details for each of the resource identifiers. In other embodiments, some resource identifiers can correspond to resource details, whereas some resource identifiers may not correspond to resource details.

At step 506, the server computer can receive the interaction data from the resource provider computer 582. In particular, the interaction module 584 of the server computer can receive the interaction data. The interaction module 584 can request a resource configuration module of the server computer to determine a set of attribute types associated with the resource provider identifier(s) and the resource provider identifier included in the interaction data.

At step 508, upon receiving the request to determine the set of attribute types, the resource configuration module 586 can determine the set of attribute types specifically associated with the resource provider identifier and the resource identifier. The set of attribute types can be stored in an attribute database 590 which can store specific sets of attribute types that are associated with resources. The resources can be associated with specific resource providers using resource identifiers and resource provider identifiers.

For example, the resource provider identifier can be "P001" and the resource identifier can be "00A1." The resource configuration module 586 can determine the set of attribute types that are associated with "P001" and "00A1." For example, the resource configuration module 586 can determine that the set of attribute types are "name," "address," and "passport number." As the resource provider computer 582 may need the attribute types of "name," "address," and "passport number" to perform the interaction with the user for the resource of a flight ticket.

The resource configuration module 586 can also determine whether or not queries are associated with the resource identifier. Each resource identifier may or may not be associated with one or more than one query. A query can comprise one or more questions.

After determining the set of attribute types associated with the resource identifier(s) and the resource provider identifier, the resource configuration module 586 can return the set of attribute types to the interaction module 584.

At step 510, after receiving the set of attribute types from the resource configuration module 586, the interaction module 584 can determine whether or not to retrieve a set of user attributes associated with the set of attribute types. For example, if the set of attribute types is empty, then the interaction module 584 may not need to determine associated user attributes; in this case, the process can then proceed to 524 to check compliance.

If the interaction module 584 received the set of attribute types comprising one or more attribute types, then the interaction module 584 can request a profile management module 588 to retrieve the set of user attributes associated with the set of attribute types.

For example, as shown in FIG. 5, the input at step 510 can include the previously received interaction data as well as the set of attribute types of "name," "postal address," "email," "passport number," and "phone number." The input can also include the queries of "Q1" and "Q2."

At steps 512-514, the profile management module 588 can determine the set of user attributes associated with the set of attribute types using the user identifier. The profile management module 588 can retrieve the set of user attributes from the attribute database 590. For example, the attribute types of "name," "postal address," "email," "passport number," and "phone number" can be associated with the user attributes of "John Doe," "1234 ABCD Street City Name, STATE, 12345," "Johndoe@abcde.com," "12345678," and "123-456-7890," respectively. The profile management module 588 can return the set of user attributes to the interaction module 584.

In some embodiments, the attribute database 590 may not include one or more user attributes of the set of user attributes. If the profile management module 588 determines that one or more user attributes of the set of user attributes is not stored in the attribute database 590, then the profile management module 588 can notify the interaction module 584 of the missing user attributes. For example, the profile management module 588 can generate and transmit a missing user attribute notification to the interaction module 584. The missing user attribute notification can comprise a list of missing attribute types. If the profile management module 588 determines that the set of user attributes are all stored in the attribute database 590, then the process can proceed to step 522 in FIG. 5B.

At step 516, after receiving the missing user attribute notification from the profile management module 588, the interaction module 584 can request the missing user attributes from the user device 580. The server computer can transmit a missing attribute request message comprising the list of missing attributes types to the user device 580. For example, the list of missing attribute types can include "phone number."

Figure 5A:
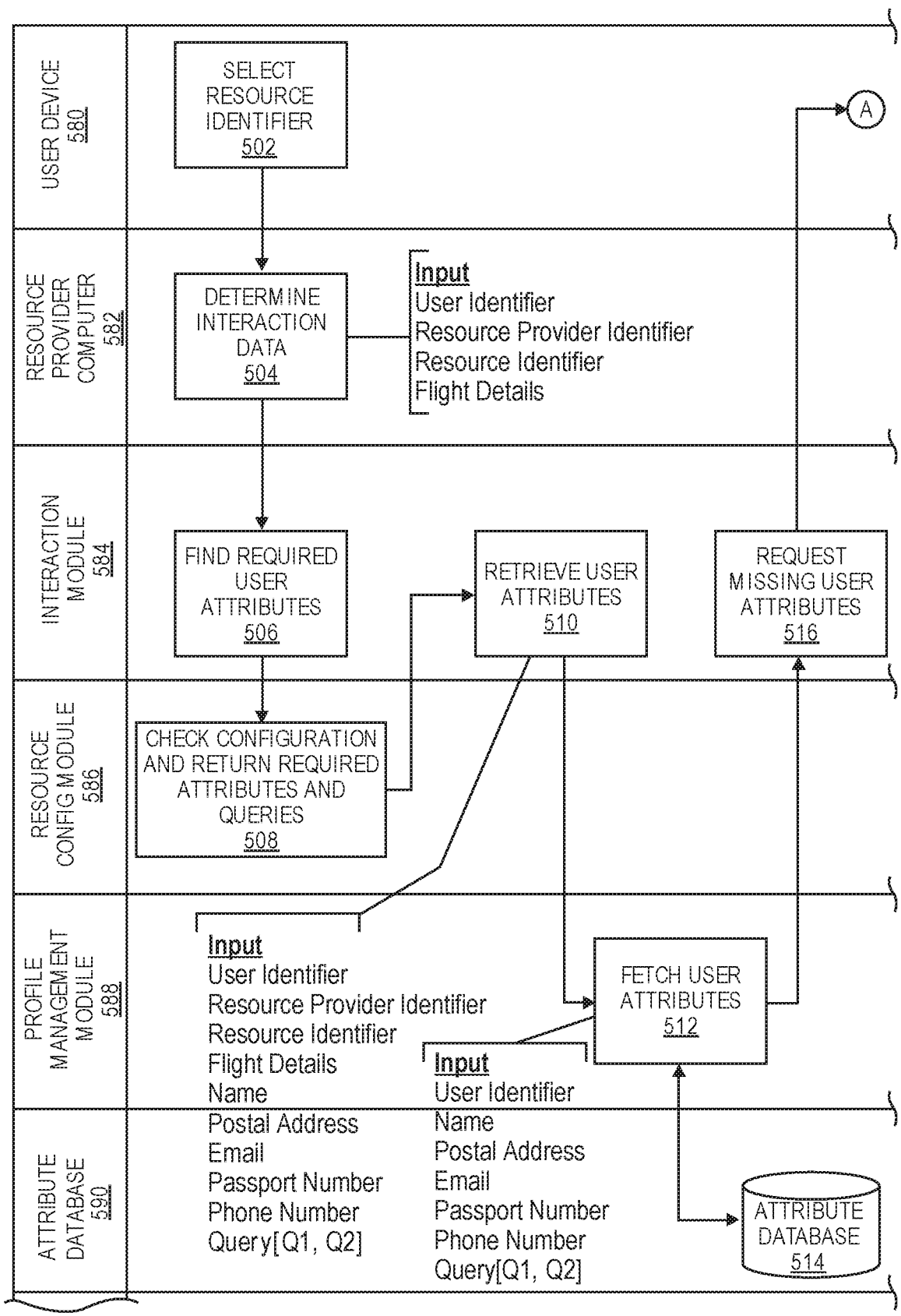
FIG. 5A shows a flow diagram illustrating an interaction process according to embodiments of the invention.
Figure 5B:
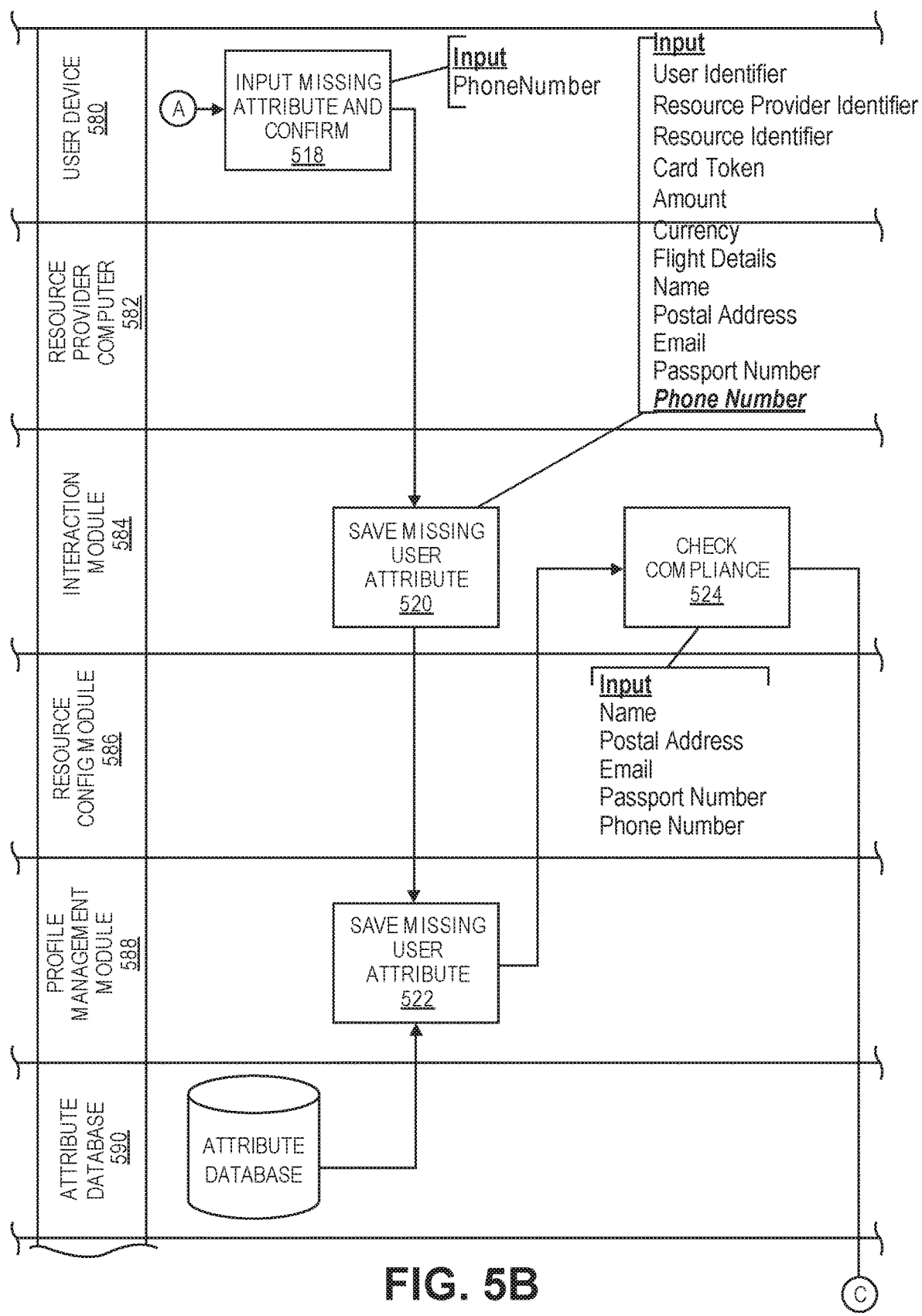
FIG. 5B shows a flow diagram illustrating an interaction process according to embodiments of the invention.

At step 518 in FIG. 5B, the user device 580 can receive the missing attribute request message from the server computer. The user device 580 can prompt the user to input missing user attribute(s) corresponding to the list of missing attribute types. For example, the user device 580 can prompt the user to input a phone number. The user can input any suitable user attribute(s) into the user device 580. After receiving the missing user attributes from the user, the user device 580 can transmit a missing attribute response message comprising the missing user attributes to the server computer.

At step 520, after receiving the missing attribute response message, the server computer can save the missing user attributes. For example, the interaction module 584 can route the missing user attributes to the profile management module 588. Then, at step 522, the profile management module 588 can store the missing user attributes in the attribute database 590.

At step 524, after determining the set of user attributes, the server computer can check for compliance. The interaction module 584 can indicate to the compliance module 592 to perform a compliance check. The interaction module 584 can forward any suitable information to the compliance module 592, such as the interaction data and/or the set of user attributes.

Figure 5C:
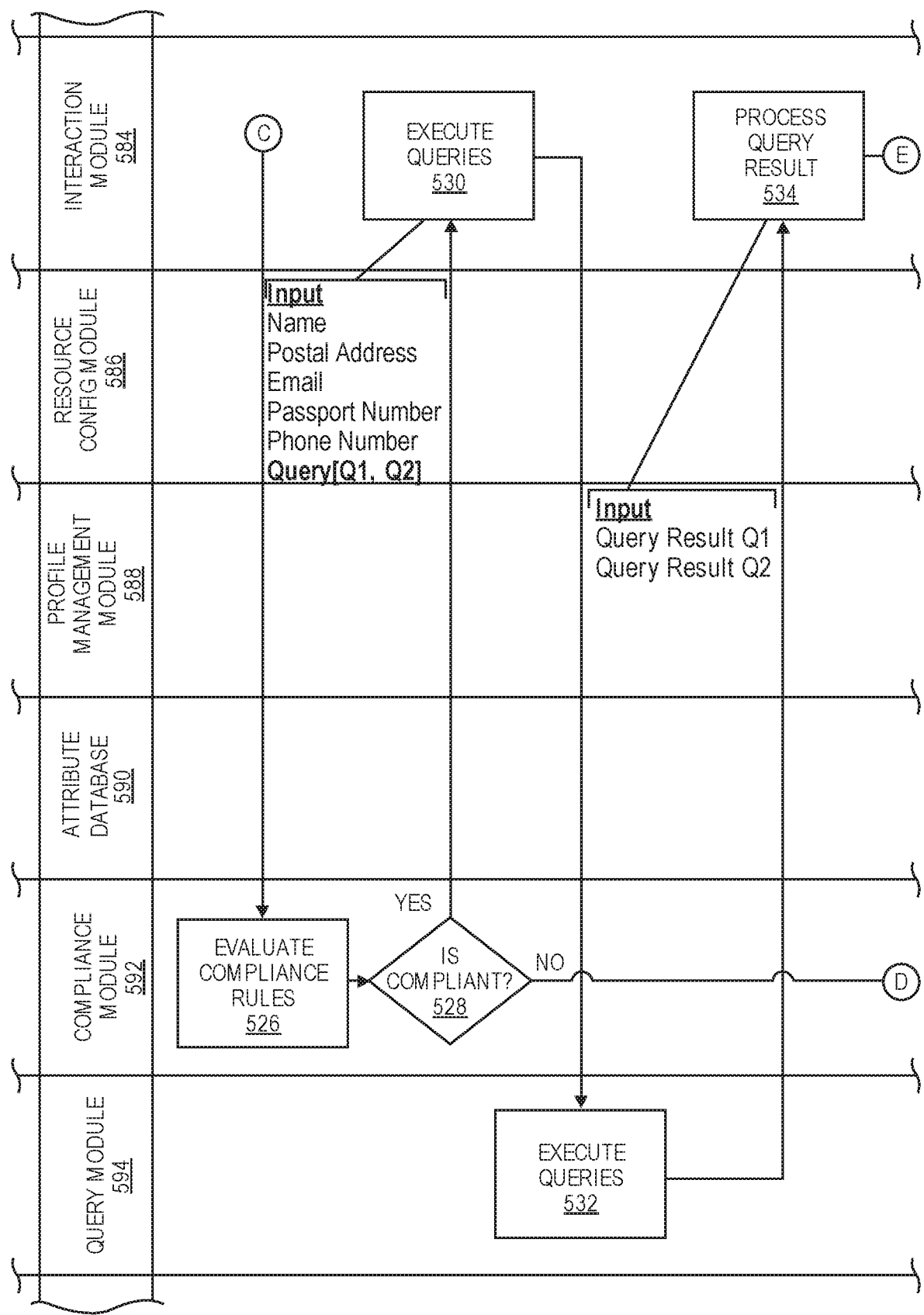
FIG. 5C shows a flow diagram illustrating an interaction process according to embodiments of the invention.
Figure 5D:
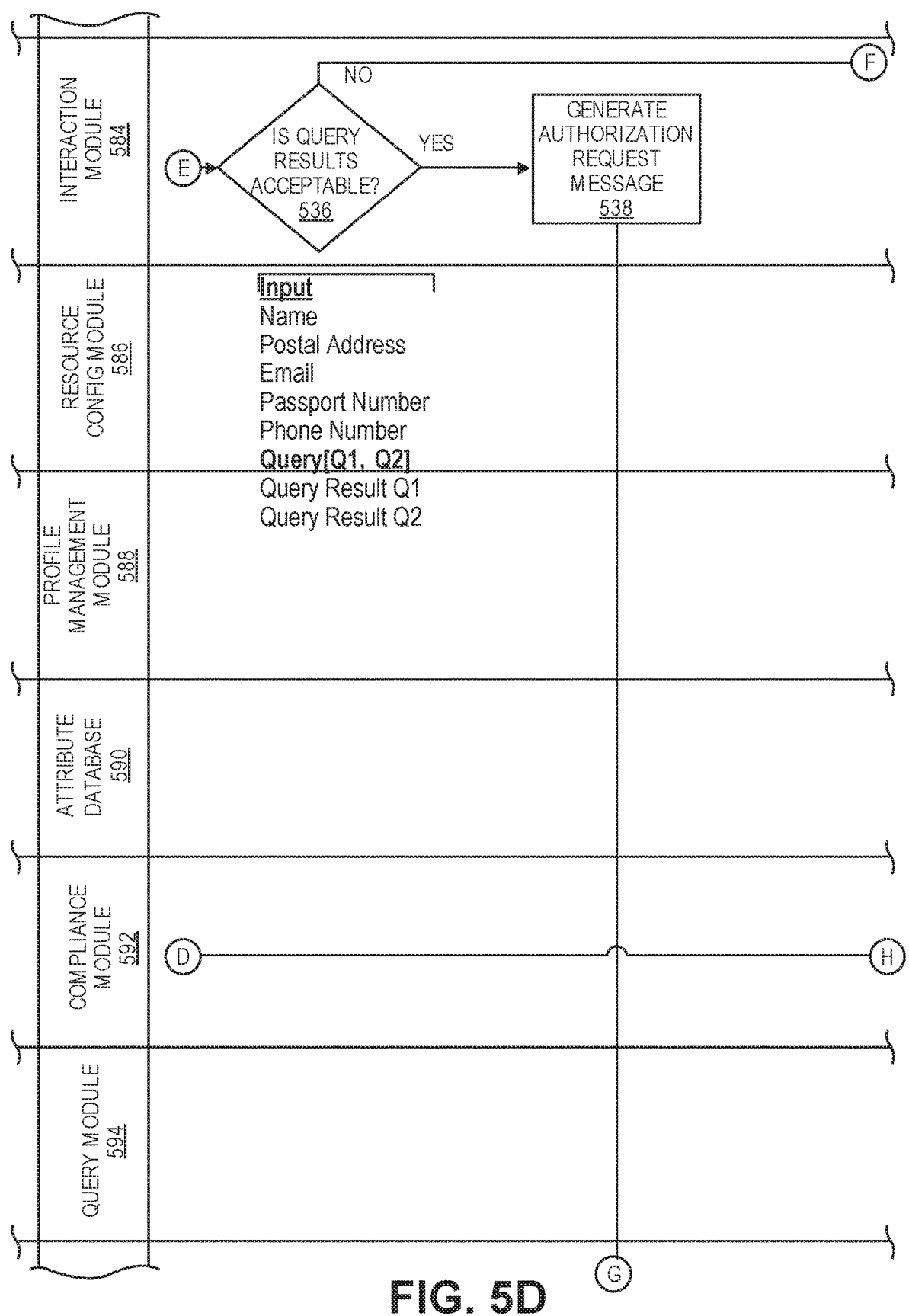
FIG. 5D shows a flow diagram illustrating an interaction process according to embodiments of the invention.

At step 526 in FIG. 5C, the compliance module 592 can evaluate compliance rules. The compliance rules can include rules that may verify whether or not local, national, and/or international rules, regulations, and/or laws are being complied with in the current interaction. The server computer can evaluate any suitable number of compliance rules related to the current interaction. For example, in some embodiments, the compliance rules can include anti-money laundering rules and/or other suitable fraud rules.

At step 528, the compliance module 592 can determine whether or not the interaction and/or user attributes are compliant. If the compliance module 592 determines that the interaction and/or the set of user attributes are not compliant, then the process can be terminated, for example, via path D in FIG. 5C. If the compliance module 592 determines that the interaction and/or the set of user attributes are compliant, then the compliance module 592 can notify the interaction module 584 that the interaction and/or the user attributes are compliant.

At step 530, after the interaction module 584 receives a compliant notification, the interaction module 584 can prompt the query module 594 to execute queries. For example, the interaction module 584 can transmit a query request message to the query module 594 comprising one or more queries (e.g., Q1, Q2, etc.). In some embodiments, the query request message can further comprise user attributes that may be associated with the one or more queries. For example, a query request message comprising a query comprising the question of "what country does the user reside in" may also comprise the user attribute associated with the attribute type of physical address.

At step 532, the query module 594 can execute a query comprising one or more questions on the set of user attributes to determine if the one or more questions are satisfied. For example, the query module 594 can receive the query request message comprising the one or more queries, then execute the one or more queries. The query module 594 can execute the queries in any suitable method, for example, the query module 594 may perform any if/then, or other suitable, logic along with any relevant user attributes to answer the one or more questions of the one or more queries. For example, for the query of "what country does the user reside in," the query module 594 can evaluate the user attribute associated with the attribute type of physical address to determine a data subfield of country.

At step 534, the interaction module 584 of the server computer can process the query results. For example, a query may include a question of "is the user eligible for free delivery?" If the query module 594 returned an answer of "yes" to the question, then the interaction module 584 can begin processing the user's eligibility for free delivery. If the query module 594 returned an answer of "no" to the question, then the interaction module 584 can process the query result by determining a shipping charge.

At step 536, after processing the query results, the interaction module 584 can determine whether or not the query results are acceptable. For example, the server computer can determine whether or not the answer(s) to the one or more questions are acceptable. For example, the server computer can determine if the queries were performed correctly on the correct user attributes. In some embodiments, the server computer can verify that the answer(s) correctly answer the one or more questions. If the one or more questions are satisfied, then the server computer can perform additional processing associated with the interaction.

If the interaction module 584 determines that the query results are not acceptable, then the server computer can terminate the process. If the interaction module 584 determines that the query results are acceptable, then the process can proceed to step 538.

At step 538, the interaction module 584 can generate an authorization request message comprising the interaction data, and in some embodiments, user credentials, which may be an attribute type stored in the attribute database 590. The server computer can transmit the authorization request message to the network computer 598. In other embodiments, the authorization request message can comprise the interaction data as well as a token. The token may be a value that takes the place of the user's credentials such as a PAN.

At step 540, after receiving the authorization request message, the network computer 598 can process the interaction data. For example, the network computer 598 can determine an authorizing entity computer of a plurality of authorizing entity computers. The network computer 598 can determine the authorizing entity computer based on any suitable routing tables as known to one of skill in the art. The network computer 598 can route the authorization request message to the authorizing entity computer. The authorizing entity computer can determine whether to authorizing or not authorize the interaction. The authorizing entity computer can then create an authorization response message and transmit the authorization response message to the network computer 598.

At step 542, in some embodiments, the network computer 598 can communicate with a token service computer 599 which may comprise a token vault. If the network computer 598 received a token in the authorization request message, the network computer 598 can request the credentials corresponding to the token from the token service computer 599. The token service computer 599 can determine the credentials in any suitable method known to one of skill in the art. For example, the token service computer 599 may be further described in U.S. Patent Pub. No. US 2015/0127547 A1 entitled "Network Token System," which is herein incorporated by reference.

At step 544, after receiving the authorization response message from the authorizing entity computer, the network computer 598 can determine whether or not the interaction was authorized. The network computer 598 can then transmit the authorization response message to the resource provider computer 582. For example, the network computer 598 can store a routing table comprising resource provider identifiers and associated communication channels. The network computer 598 can determine the appropriate communication channel associated with the resource provider identifier included in the interaction data.

Figure 5E:
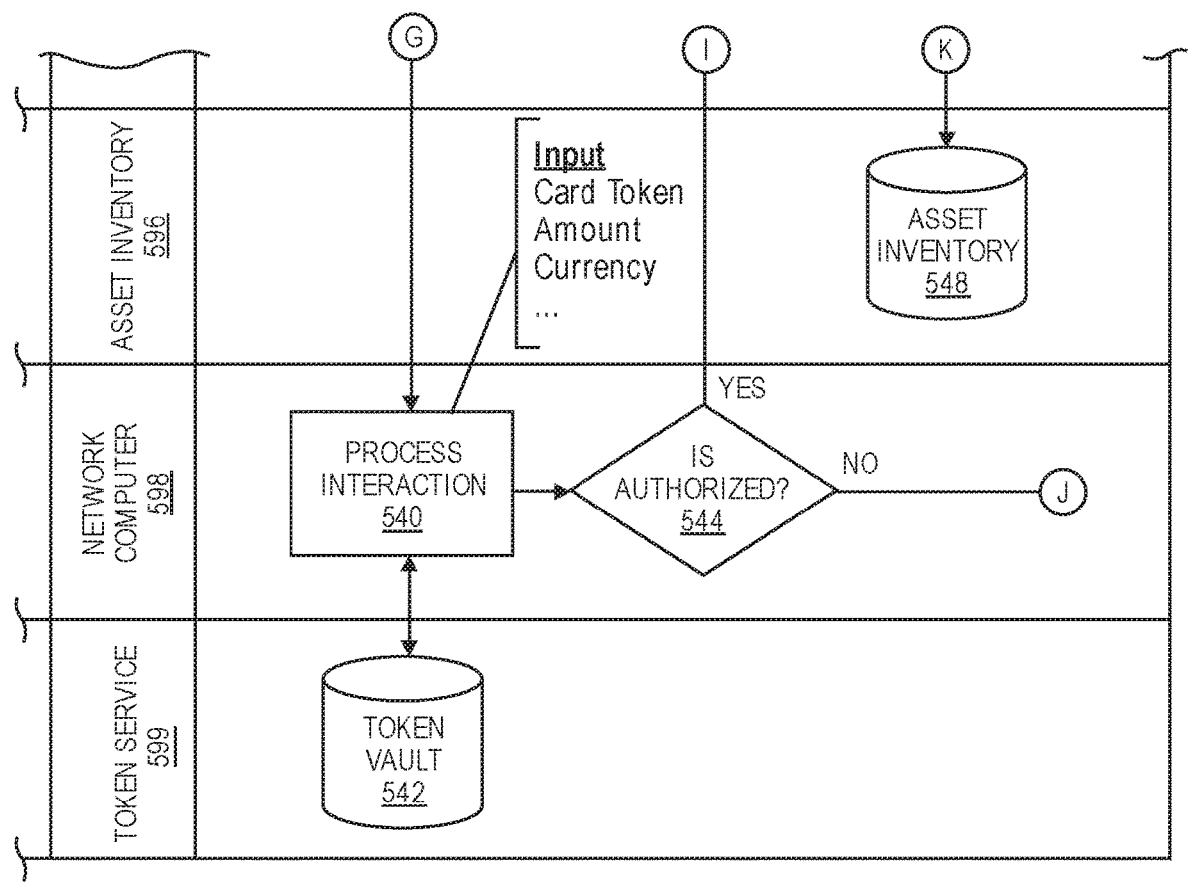
FIG. 5E shows a flow diagram illustrating an interaction process according to embodiments of the invention.
Figure 5F:
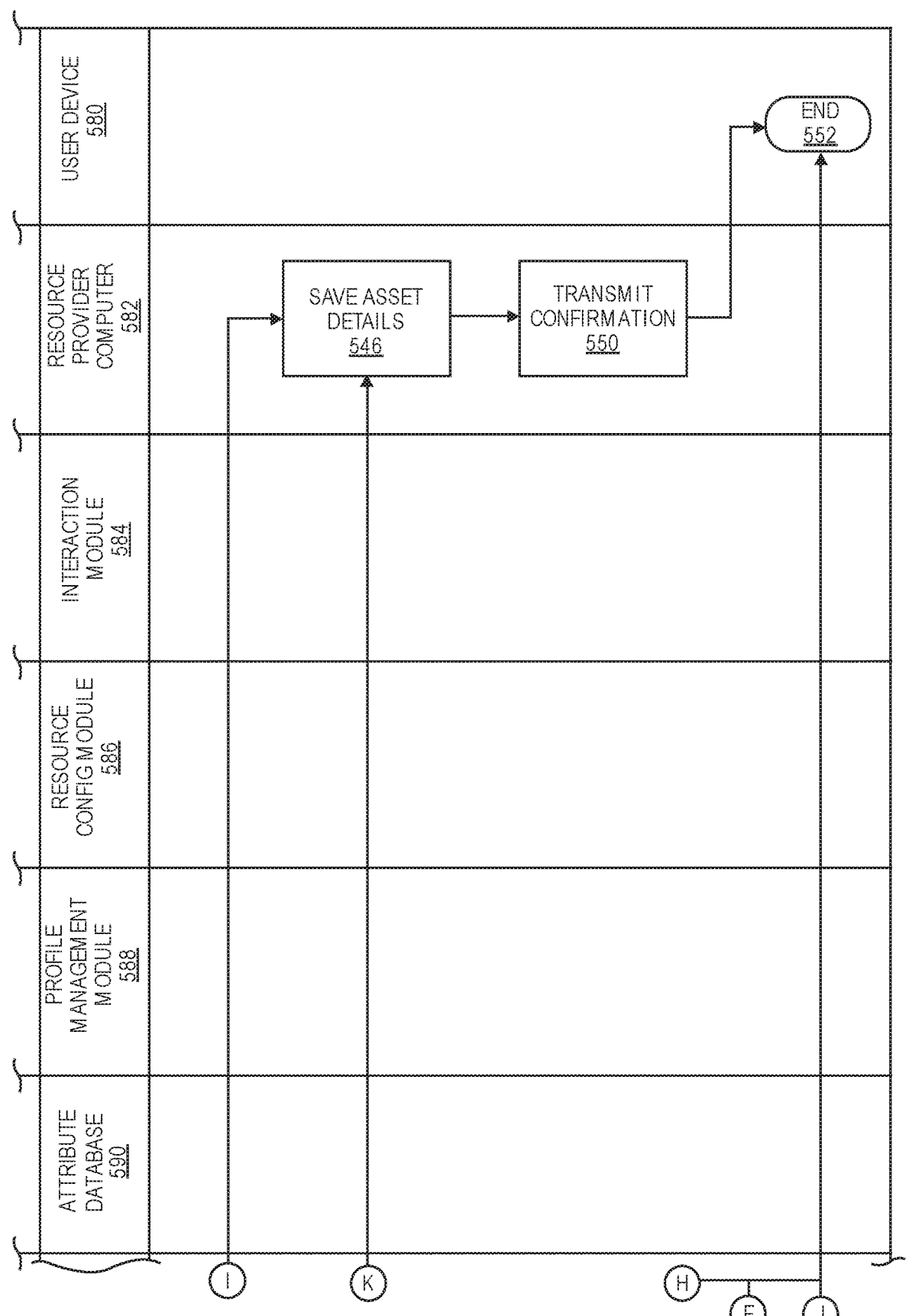
FIG. 5F shows a flow diagram illustrating an interaction process according to embodiments of the invention.

At step 546 in FIG. 5F, after receiving the authorization response message, the resource provider computer 582 can determine to save resource details associated with the resource identifier included in the interaction data. The resource details can include any suitable information regarding the asset. For example, the interaction data can include the resource identifier of "00A1" corresponding to a flight from San Francisco to New York City. The resource details can include the flight details (i.e., resource details), such as, takeoff and landing times, airline, flight number, baggage restrictions, quick response (QR) code, an/or any other suitable flight details.

At step 548 in FIG. 5E, the asset inventory 596 of the server computer can receive the resource details from the resource provider computer 582. The asset inventory 596 can store the resource details in an asset inventory 596 of the user. The resource details can be stored in any suitable manner.

Referring back to FIG. 5F, at step 550, after transmitting the resource details to the server computer, the resource provider computer 582 can transmit a confirmation to the user device 580. The confirmation can include the resource details and/or the interaction data. For example, the confirmation can include "interaction completed successfully for flight 00A1 from San Francisco to New York City on Jul. 3, 2019. Click here for more details."

At step 552, after the user receives the resource details and/or the interaction data, the process can end. In some embodiments, the user can later access the resource details via the asset inventory 596 of the server computer.

Figure 6:
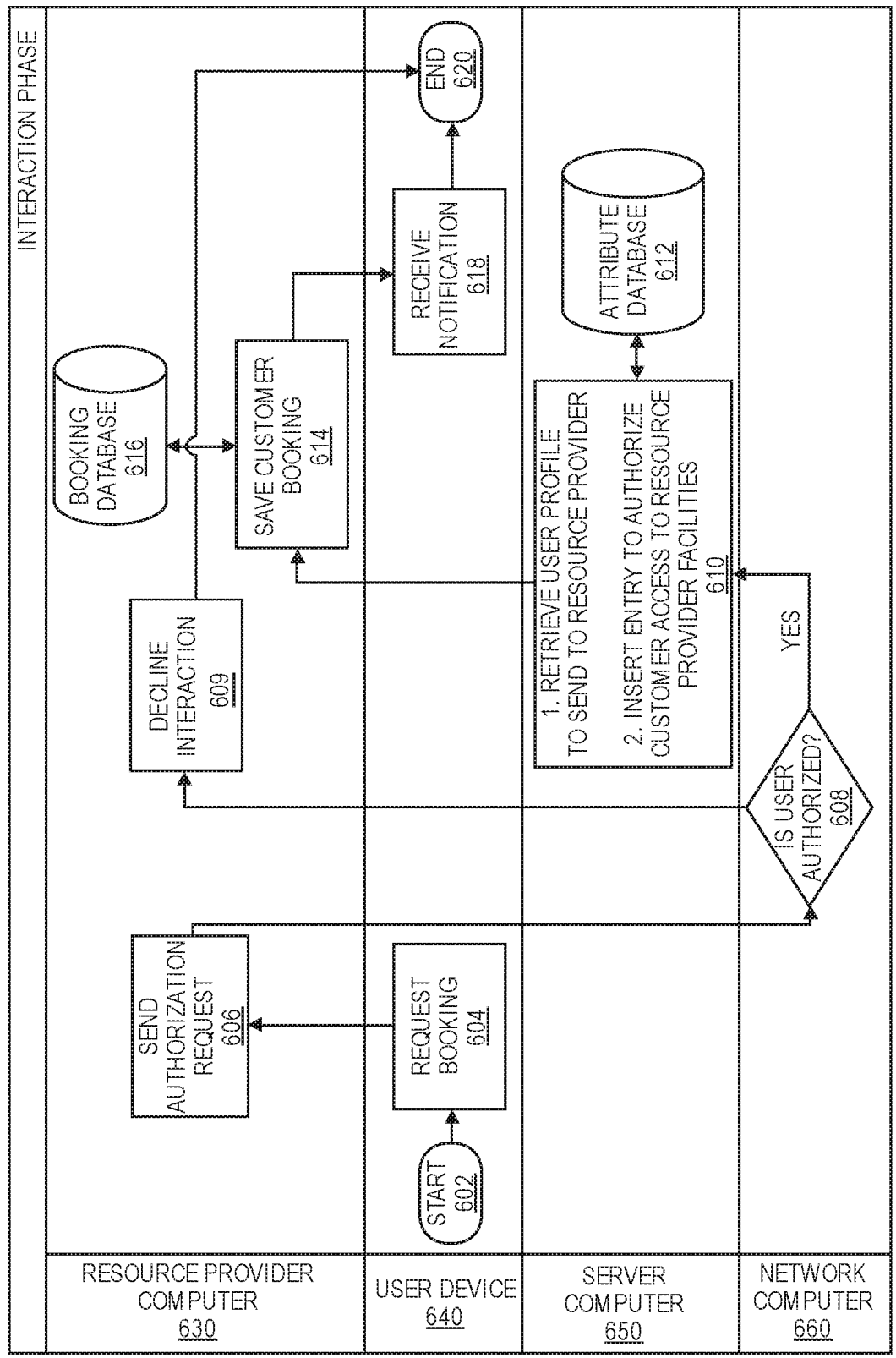
FIG. 6 shows a flow diagram illustrating an interaction phase of an interaction process according to embodiments of the invention.

FIG. 6 shows a flowchart of an interaction phase of an interaction process according to an embodiment of the invention. The method illustrated in FIG. 6 will be described in the context of a user booking a hotel. It is understood, however, that the invention can be applied to other circumstances (e.g., booking a cruise, requesting data, requesting access to a secure location, etc.). Although the steps are illustrated in a specific order, it is understood that embodiments of the invention may include methods that have the steps in different orders. In addition, steps may be omitted or added and may still be within embodiments of the invention.

The process described in FIG. 6 can start at step 602. A user of a user device 640 can select a resource identifier though a webpage hosted by a resource provider computer 630. The resource identifier can be associated with a resource of a hotel booking.

At step 604, the user device 640 can request the hotel booking from the resource provider computer 630. The user device 640 can transmit the resource identifier and a user identifier to the resource provider computer 630.

At step 606, after receiving the resource identifier and the user identifier from the user device 640, the resource provider computer 630 can transmit an authorization request message comprising the resource identifier, the user identifier, a resource provider identifier and resource details (i.e., interaction data). The resource details can correspond with the resource identifier as described herein.

At step 608, the network computer 660 can receive the authorization request message from the resource provider computer 630. In some embodiments, a transport computer may route the authorization request message from the resource provider computer 630 to the network computer 660. After receiving the authorization request message, the network computer 660 can transmit the authorization request message to an authorizing entity computer.

Upon receiving the authorization request message, the authorizing entity computer can determine whether or not to authorize the interaction between the user and the resource provider. After determining whether or not the interaction is authorized, the authorizing entity computer can transmit an authorization response message to the network computer.

After receiving the authorization response message, the network computer 660 can determine whether or not the interaction was authorized by the authorizing entity computer. At step 609, if the authorization response message comprises an indication that the interaction is not authorized, then the network computer 660 can transmit the authorization response message to the resource provider computer 630 and, in some embodiments, via the transport computer. The resource provider computer 630 can then end the interaction with the user device 640. If the authorization response message comprises an indication that the interaction is authorized, then the network computer 660 can transmit the authorization response message to the server computer 650.

At step 610, after receiving the authorization response message from the network computer 660, the server computer 650 can retrieve a user global identity from the attribute database 612. The user global identity can be associated with the user identifier.

The server computer 650 can create an asset in an asset inventory for the user. The server computer 650 can add an asset comprising the resource details for the resource associated with the resource identifier to the asset inventory. For example, the server computer 650 can add the details of the hotel booking to the asset inventory.

The server computer 650 can then transmit the authorization response message to the resource provider computer 630.

At step 614, after receiving the authorization response message from the server computer 650, the resource provider computer 630 can store any suitable data associated with the interaction. For examples, the resource provider computer 630 can store the resource details and the user identifier in a booking database 616.

At step 618, after storing data associated with the interaction, the resource provider computer 630 can transmit a notification of the authorized interaction to the user device 640. In some embodiments, the resource provider computer 630 can transmit the authorization response message to the user device 640.

Figure 7:
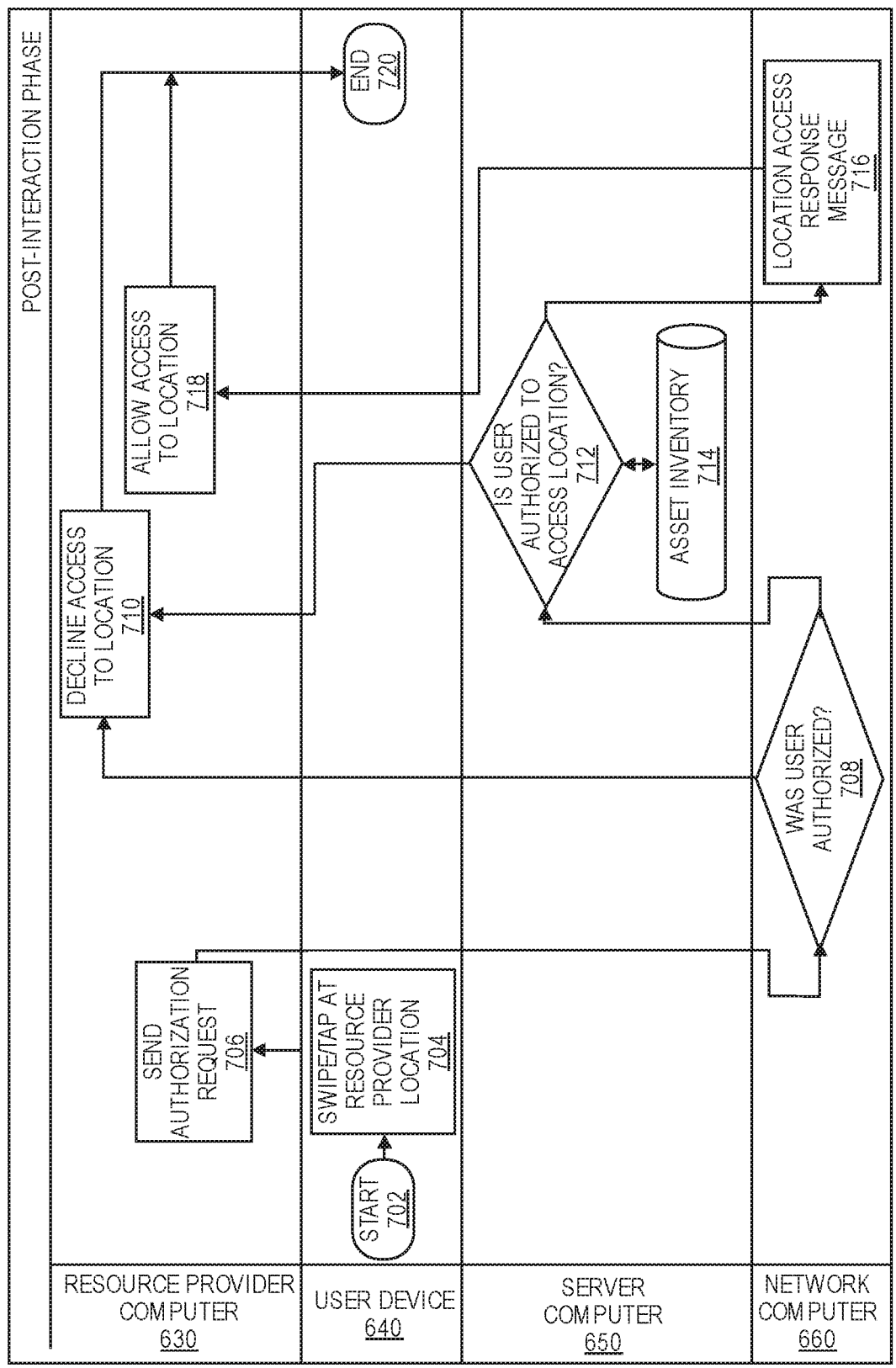
FIG. 7 shows a flow diagram illustrating a post-interaction phase of an interaction process according to embodiments of the invention.

FIG. 7 shows a flowchart of a post-interaction phase of an interaction process according to an embodiment of the invention. The method illustrated in FIG. 7 will be described in the context of a user checking in to a resource provider location after booking a hotel, as described in FIG. 6. It is understood, however, that the invention can be applied to other circumstances. Although the steps are illustrated in a specific order, it is understood that embodiments of the invention may include methods that have the steps in different orders. In addition, steps may be omitted or added and may still be within embodiments of the invention.

When the user checks into the hotel, the user device can be used to access the user's booked rooms and/or other facilities. The user may no longer need to worry about carrying an additional card with them. The user device can be sufficient to allow them to access the secure locations. After booking a hotel room, as described in FIG. 6, at step 704, the user can bring the user device 640 into proximity with the resource provider computer 630. In some embodiments, an access device may be an operative intermediary between the user device 640 and the resource provider computer 630. The user device 640 can be in operative communication with the access device. For example, the user device 640 and the access device may communicate via a near-field communication (NFC) channel, a Bluetooth low energy (BLE) communication channel, etc. The user device 640 can transmit at least the user identifier and the resource identifier to the resource provider computer 630.

At step 706, after receiving the user identifier, the resource provider computer 630 can generate an authorization request message comprising the user identifier and the resource identifier to determine whether or not the user is authorized to access the location. In some embodiments, the authorization request message can further comprise resource details associated with the resource identifier. The resource provider computer 630 can then transmit the authorization request message to the network computer 660.

At step 708, after receiving the authorization request message from the resource provider computer 630, the network computer 660 can determine whether or not the user has been previously authorized for the interaction. For example, the network computer 660 can determine whether or not the user's payment account has been charged for the interaction.

If the user was not authorized, then the network computer 660 can transmit an authorization response message indicating that the user was not previously authorized to access the location to the resource provider computer 630 and the process can proceed to step 710.

If the user was authorized, then the network computer 660 can transmit a location access request message to the server computer 650. The location access request message can include a query as to whether or not the user is authorized to access the location (i.e., hotel room) and can request an access code to access the location. In this case, the process can proceed to step 712.

At step 710, after receiving the authorization response message, the resource provider computer 630 can decline access to the secure location for the user.

At step 712, after receiving the location access request message from the network computer 660, the server computer 650 can determine whether or not the user is associated with an asset of a digital keycard, or other digital asset of accessing the location. The server computer 650 can query the asset inventory 714 for an asset associated with the resource identifier. For example, the asset stored in the asset inventory 714 can include a location access code, or other suitable information that may allow the user to access the location. The server computer 650 can then transmit the location access code, or the like, to the network computer 660.

In some embodiments, at step 712, the server computer 650 may determine that the user is not associated with the asset of the digital keycard. The server computer 650 can generate a location access response message indicating that the user is not authorized to access the location. FIG. 7 illustrates the server computer 650 transmitting the location access response message to the resource provider computer 630, however, it is understood that the location access response message can be routed to the resource provider computer 630 via the network computer 660.

At step 716, after receiving the location access response message, the network computer 660 can then transmit the location access response message comprising the location access code to the resource provider computer 630.

At step 718, after receiving the authorization response message, the resource provider computer 630 can allow the user to access the secure location with the location access code. For example, the resource provider computer 630 can prompt the access device to unlock a door to the hotel room if the location access code is correct.

Figure 8:
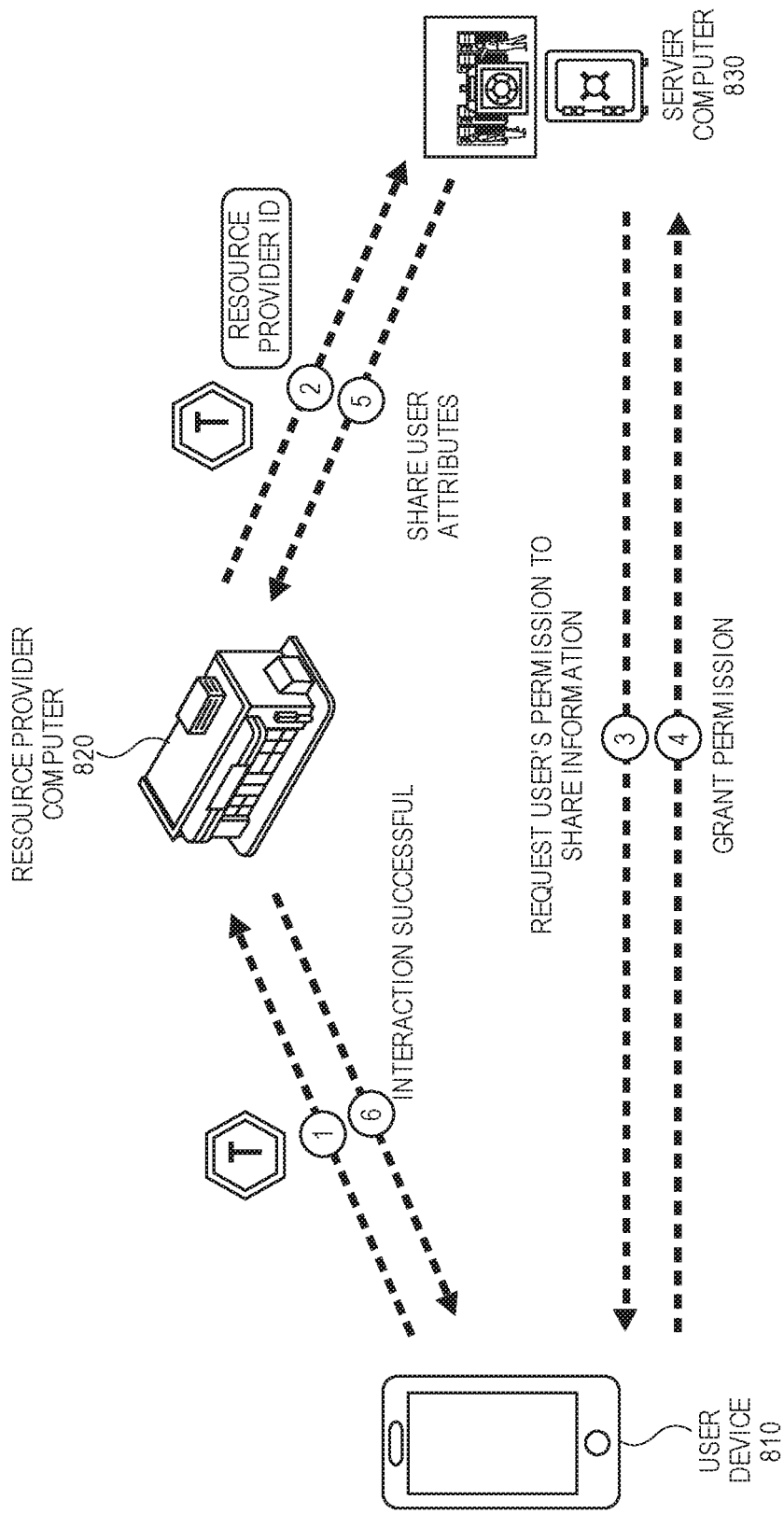
FIG. 8 shows a flow diagram illustrating a permission request according to embodiments of the invention.

FIG. 8 shows a flowchart of a permission request method according to an embodiment of the invention. The method illustrated in FIG. 8 will be described in the context of a server computer requesting permission from a user for a resource provider computer to access user attributes. It is understood, however, that the invention can be applied to other circumstances. Although the steps are illustrated in a specific order, it is understood that embodiments of the invention may include methods that have the steps in different orders. In addition, steps may be omitted or added and may still be within embodiments of the invention.

FIG. 8 includes a user device 810, a resource provider computer 820, and a server computer 830 which may be in operative communication with one another via any suitable communication channel(s) described herein.

At step 1, the user device 810 can transmit a user identifier and a resource identifier to the resource provider computer 820, as described herein. Upon receiving the user identifier and the resource identifier, the resource provider computer 820 can create interaction data comprising the user identifier, the resource identifier, and a resource provider identifier.

At step 2, the resource provider computer 820 can transmit the interaction data to the server computer 830. After receiving the interaction data from the resource provider computer 820, the server computer 830 can determine a set of attribute types specifically associated with the resource provider identifier and the resource identifier. The server computer 830 can determine whether or not the resource provider has permission to receive the user attributes associated with the set of attribute types.

The server computer 830 can access an attribute database, such as the attribute database 406 shown in FIG. 4. The server computer 830 can determine which permission levels each of the attribute types of the set of attribute types is associated with. For example, the set of attribute types can include name and phone number. In reference to FIG. 4, the server computer 830 can determine that the attribute type of name is of tier 1 422 which does not require a user's permission. The server computer 830 can also determine that the attribute type of phone number is of tier 2 424 which requires a user's permission.

After determining the permission levels, the server computer 830 can determine a highest permission level. For example, if the server computer 830 determines that the attribute types of name and phone number correspond to permission levels of tier 1 and 2, respectively, the server computer 830 can determine that the highest permission level is of tier 2.

At step 3, the server computer 830 can transmit a permission request message to the user device 810. The permission request message can include a question to whether or not the user will allow the resource provider to access the user attributes associated with the set of attribute types. In some embodiments, the permission request message can further comprise the resource provider identifier.

After receiving the permission request message, a global identity application on the user device 810 can prompt the user to grant or reject permission for the resource provider. In some embodiments, the user device 810 can display the resource provider identifier to the user so that the user knows which resource provider will gain access to the user's user attributes corresponding to the set of attribute types.

The user device 810 can receive input from the user indicating whether or not permission is granted. At step 4, the user device 810 can transmit a permission response message comprising the indication of whether or not permission is granted to the server computer 830.

After receiving the permission response message, the server computer 830 can determine whether or not permission was granted for the resource provider to receive the user attributes associated with the set of attribute types. If the server computer 830 determines that permission was not granted, then the server computer 830 can terminate the process and notify the resource provider computer 820 that permission to access the user attributes associated with the set of attribute types was denied.

If the server computer 830 determines that permission was granted, then the server computer can determine, using the user identifier, a set of user attributes associated with the set of attribute types. The server computer 830 can then process the interaction, for example by performing steps 512-552 as described in FIGS. 5A-5F.

At step 5, the server computer 830 can transmit the set of user attributes associated with the set of attribute types to the resource provider computer 820. For example, the server computer 830 can transmit the user attributes of name and phone number to the resource provider computer 820.

At step 6, after receiving the set of user attributes, the resource provider computer 820 can transmit a notification to the user device 810. The notification can indicate that the interaction was successful. In some embodiments, the resource provider computer 820 can further process the set of user attributes. For examples, the resource provider computer 820 may process a visa application, process a passport application, grant access to a secure location, fulfil resources, etc.

III. Use Cases

Figure 9:
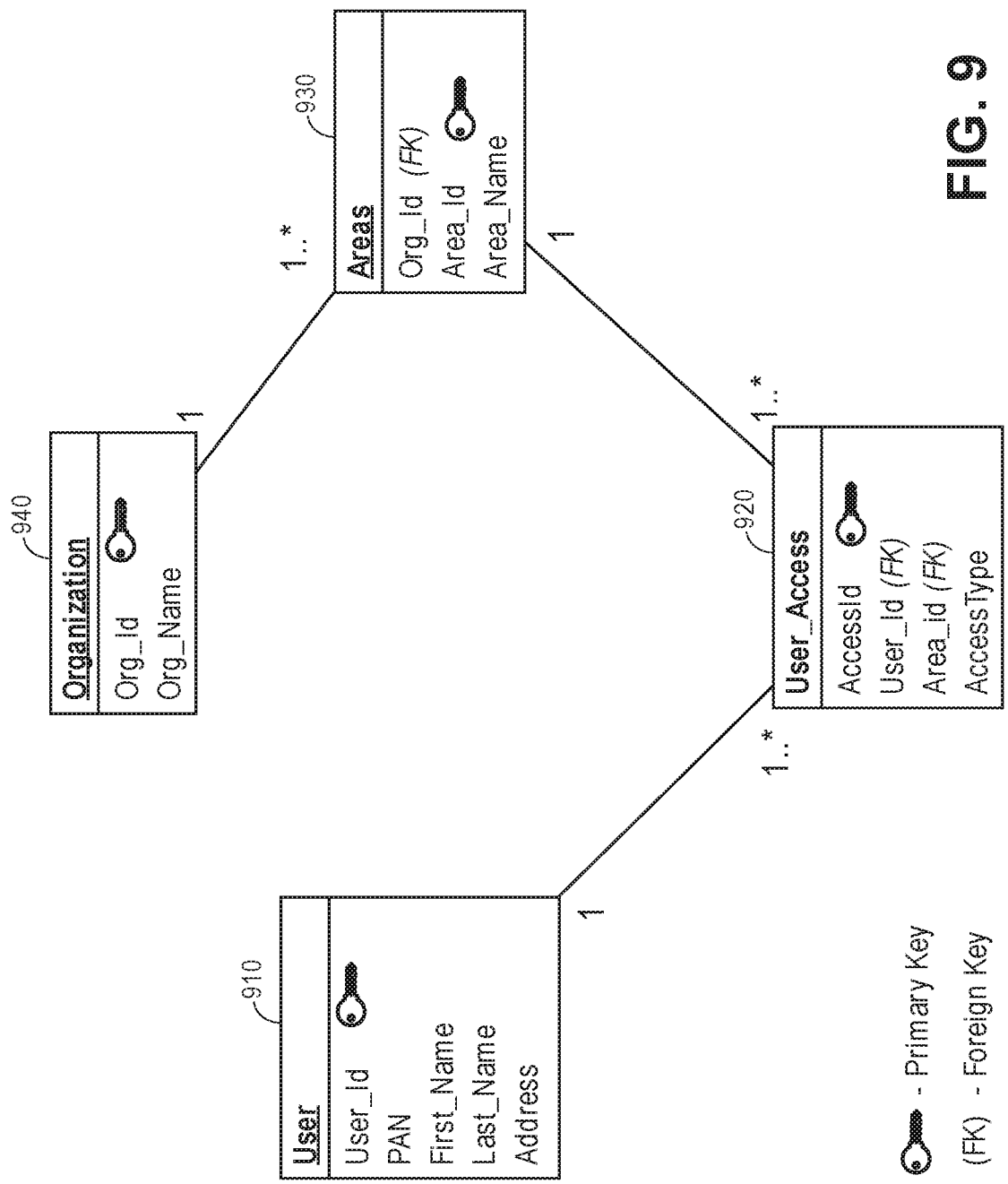
FIG. 9 shows an entity-relationship diagram illustrating a location access data structure according to embodiments of the invention.

Next, several use cases will be discussed. First a visa application process will be described, for example, a user can apply for a visa for the country of Japan. Further, FIG. 9 shows a location access process and then FIG. 10 shows a proxy interaction process.

A visa application process can be performed according to embodiments of the invention. The method will be described in the context of a user applying for a visa for Thailand. It is understood, however, that the invention can be applied to other circumstances (e.g., applying for a visa for Japan, applying for other types of residency, applying for a driver's license, etc.). Although the steps are illustrated in a specific order, it is understood that embodiments of the invention may include methods that have the steps in different orders. In addition, steps may be omitted or added and may still be within embodiments of the invention.

Currently, the visa application process is cumbersome and involves many steps. For example, currently a user needs to 1) check their passport, 2) fill out the visa application form, 3) make a payment to acquire the visa, 4) collect the visa by mail (or in person), and 5) present the visa to an immigration officer at the border.

Embodiments of the invention provide for a simple and seamless application process. For example, the user (i.e., applicant) can to go to the marketplace module and select the country that they want to apply for a visa. Since, the attribute database can store user attributes, the information that is required for the visa application can be automatically provided by the server computer from the attribute database to the requesting entity (i.e., visa application authority). In some embodiments, additional user attributes may be needed for the application (e.g., bank account statements, passport number, list of relatives, etc.) if the user attributes are not stored in the attribute database. The server computer 300 can request these missing attributes from the relevant entity. For example, in the case of needing a bank account statement, the server computer 300 can contact the user's bank on file to request the information.

In some embodiments, the user can be asked for permission for certain actions, as described herein. For example, the server computer 300 can request authorization to contact the user's bank from the user. The user can then grant permission, for example, by scanning a biometric such as a thumbprint on their user device. The server computer 300 can be granted the appropriate permission if the user is authentic.

In some embodiments, the user can enter any information manually if no entity can provide it. The server computer can then store the missing user attributes in the attribute database for future use as described herein.

FIG. 9 shows an entity-relationship diagram illustrating a location access data structure according to embodiments of the invention. A server computer, according to embodiments of the invention, can manage a user's global identity and can perform authentication as well as authorization. Locations, such as offices, can grant different permissions to different users; allowing, for example, only required people access to secure facilities. An entity, such as an organization, can be able to define globally different access areas that they have and then grant a user access to one or more areas.

FIG. 9 shows a user data table 910, a user_access data table 920, an areas data table 930, and an organization data table 940. The user data table 910 can comprise a number of data elements. The data elements can include "User_Id," "PAN," "First_Name," "Last_name," and "Address." The data elements of the user_access data table 920 can include "AccessId," "User Id," "Area_id," and "AccessType." The data elements of the areas data table 930 can include "Org_Id," "Area_Id," and "Area_Name." The data elements of the organization data table 940 can include "Org_Id," and "Org_Name."

The data tables in FIG. 9 may include primary key(s) and/or foreign key(s). A primary key can be a specific choice of a minimal set of columns that uniquely specify a row in a table. A foreign key can be a field (or a collection of fields) in a table that uniquely identifies a row of another table or the same table. A foreign key can refer to the primary key of another table. For example, as shown in FIG. 9, the organization data table 940 can be related to the areas data table 930 via the "Org_Id" primary/foreign key. The areas data table 930 can be related to the user_access data table 920 via the "Area_Id" primary/foreign key. The user_access data table 920 can be related to the user data table 910 via the "User Id" primary/foreign key. The primary keys and foreign keys can link the data tables to one another.

Due to this relationship between the data tables using the primary keys and the foreign keys, the server computer can add an "Area_Id" foreign key as an asset to the user_access data table 920 associated with the user data table 910. The "Area_Id" foreign key can relate to an area data table which is associated with a particular organization data table (e.g., areas data table 930 and organization data table 940, respectively). The server computer can add the "Area_Id" foreign key to the user's asset inventory (i.e., user access data table 920) after the user performs an interaction to obtain an asset of secured area access, as described herein, with a resource provider computer, which may be associated with the organization data table 940.

The user may then be capable of accessing the area associated with the "Area_Id" asset. For example, the user may swipe their user device that stores the users assets at their workplace. The user can be granted access to the secure workplace if the user device has the "Area_Id" asset.

FIG. 10 shows a flowchart of a proxy interaction process according to an embodiment of the invention. The method illustrated in FIG. 10 will be described in the context of a first user requesting a second user to interact with a resource provider to allow the first user to access secure data. It is understood, however, that the invention can be applied to other circumstances (e.g., accessing a secure location, performing an interaction, etc.). Although the steps are illustrated in a specific order, it is understood that embodiments of the invention may include methods that have the steps in different orders. In addition, steps may be omitted or added and may still be within embodiments of the invention.

Prior to step 1, a first user of a first user device 1010, a second user of a second user device 1020, and a resource provider of a resource provider computer 1030 can enroll in a global identity program as described herein.

At step 1, the second user device 1020 can transmit an interaction request to the first user device 1010. The interaction request can comprise a resource identifier as well as a resource provider identifier selected by the second user. For example, the second user may request the first user to purchase a resource for the second user.

At step 2A, the first user device 1010 can receive the interaction request. The first user device 1010 can notify the first user of the interaction request. At step 2B, the first user device 1010 can receive an interaction method from the first user. For example, the first user device 1010 can prompt the user to select an interaction method of a plurality of interaction methods. For example, the interaction methods can include credit card, debit card, prepaid card, etc. At step 2C, the first user device 1010 can prompt the first user to approve the interaction request. For example, the first user can decide whether or not to perform the interaction with the resource provider computer 1030 on behalf of the second user. For example, if the first user does not know who the second user is, then the first user may decide to not perform the interaction. However, the first user may know who the second user is and can decide to perform the interaction (e.g., purchase a resource such as a bus ticket for the second user).

At step 3, the first user device 1010 and the resource provider computer 1030 can perform an interaction with the resource identifier and the resource provider identifier as described herein. For example, the first user device 1010 and the resource provider computer 1030 can perform steps 502-552 as shown in FIGS. 5A-5F.

At step 4, after performing the interaction with the resource provider computer 1030, the first user device 1010 can transmit an interaction confirmation to the second user device 1020. The interaction confirmation can include any suitable data associated with the interaction. For example, the interaction confirmation can include the resource identifier, resource details, the resource provider identifier, etc.

At step 5, after performing the interaction with the first user device 1010, the resource provider computer 1030 can release the resource to the second user of the second user device 1020. For example, the resource provider computer 1030 can allow the second user to access secure data. As another example, the resource provider computer 1030 can add a bus ticket, or other suitable resource, as an asset to the second user's asset inventory.

As yet another example, a first user can grant a first user the permission to use something that the first user has listed in their asset database. For example, a first user may own a car and live in San Francisco. While the first user is out of town, a second user may want to borrow the first user's car. The second user can be able to request access to the first user's car using a second user device via the server computer. The server computer can then transmit an asset request message to the first user device, operated by first user. The first user can grant permission to the second user to access the car. Upon receiving the grant of permission, the server computer can add the car to the second user's asset list. In some embodiments, the car can be added to the asset list in relation to an expiration date, for example, 1 day, 1 week, 2 months, etc. The second user device may then have access to the car, as listed in the asset database. The second user device may then be capable of accessing the car via a coded signal transmitted by radio waves to a receiver unit in the car. The second user device can access the correct coded signal in the asset database. Similar to accessing cars in above example, embodiments of the invention can allow for users to access homes and other resources.

Embodiments of the invention have a number of advantages. For example, the server computer can determine attribute types associated with a resource identifier and a resource provider identifier received from a resource provider computer. Each resource identifier can be associated with a different set of attribute types.

For example, a resource provider can be a location access entity that can provide access to secure locations. The location access entity can offer access both to a user's house as well as to the user's workplace. The resource of access to the house and the resource of access to the workplace can be associated with different sets of attribute types. For example, the resource of access to the house can be associated with the attribute types of name and physical address. Whereas, the resource of access to the workplace can be associated with the attribute types of name and a proof of employment (e.g., a paystub from the employer).

When the user requests access to a secure the house, the resource provider can request a report of user information from the server computer. The server computer can determine a set of attribute types (e.g., proof of address) specifically associated with the resource provider identifier and the resource identifier (e.g., secure location access for a house). The server computer can return the user attributes needed by the resource provider.

Similarly, if the user requests access to the workplace, then the server computer may provide the user attributes corresponding to the set of attribute types (e.g., proof of employment) to the resource provider. In this way, the resource provider can receive different user attributes based on the requested resource identifier. The user's information is not completely given out to the resource providers, thus preserving the user's privacy.

Embodiments of the invention provide for additional advantages. For example, during an interaction, a user can request a loan from an entity. In a first case, the user can request a loan for a house from a bank. In a second case, the user can request a loan for a new computer from a merchant. Currently, both of these entities can pull the user's credit report from a credit bureau. Both the bank and the merchant can receive the user's full credit history. However, the full credit history is not needed for the loan for the computer. The merchant can obtain extraneous information about the user. Additionally, the merchant, as well as the bank, can store the user's credit history, further opening the user up to potential data breaches. Embodiments, of the invention provide for systems and methods to limit the amount of information given to the resource provider (e.g., bank, merchant, etc.) based on the resource identifiers (e.g., loan for a house, loan for a computer, etc.), thus preserving the privacy of the user's data as well as decreasing the amount of data that can be compromised during a data breach.

Furthermore, the server computer can execute one or more queries on the user attributes, which may reduce the amount of information provided to the resource provider computer, thus preserving the privacy of the user.

Embodiments of the invention provide for additional advantages. For example, tiers of attribute types can correspond to a user permission level. Certain tiers of attribute types can require a user's permission prior to user attributes corresponding to the attribute types being provided to the resource provider computer.

The combination of the aforementioned advantages allows for an increase in user data privacy as well as data security.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by an interaction module of a server computer from a resource provider computer, interaction data comprising a user identifier, a resource provider identifier, and a resource identifier, wherein the interaction data is associated with an interaction between a resource provider and a user;
   determining, by a resource configuration module of the server computer, a set of attribute types specifically associated with the resource provider identifier and the resource identifier;
   determining, by the interaction module of the server computer and using the user identifier, a set of user attributes associated with the set of attribute types;
   determining, by the interaction module of the server computer, a set of missing user attributes not stored in an attribute database;
   transmitting, by the interaction module of the server computer to a user device associated with the user identifier, a missing attribute request message comprising the set of missing user attributes;
   receiving, by the interaction module of the server computer from the user device, a missing attribute response message comprising missing user attributes;
   storing, a profile management module of the server computer, the missing user attributes in the attribute database;
   executing, by the interaction module of the server computer, a query comprising one or more questions on the set of user attributes and the stored missing user attributes to determine if the one or more questions are satisfied; and
   in response to the one or more questions being satisfied, then performing by the interaction module of the server computer, additional processing associated with the interaction.

2. The method of claim 1, wherein the one or more questions are privacy preserving questions, and answers to the questions are provided to the resource provider computer.

3. The method of claim 1, wherein the set of attribute types are in a user permissions database, the user permissions database storing a plurality of attribute type sets, each attribute type set being associated with a permission level identified by the user.

4. The method of claim 1, wherein the set of attribute types is stored in the attribute database which stores specific sets of attribute types that are associated with resources, the resources being associated with specific resource providers using resource identifiers and resource provider identifiers.

5. The method of claim 1, wherein the one or more questions are associated with the set of attribute types specifically associated with the resource provider identifier and the resource identifier.

6. The method of claim 1, wherein the additional processing comprises:
   generating, by the server computer, an authorization request message comprising the interaction data;
   transmitting, by the server computer, the authorization request message to a network computer, wherein the network computer routes the authorization request message to an authorizing entity computer, wherein the authorizing entity computer determines whether or not to authorize the interaction, generates an authorization response message, and transmits the authorization response message to the server computer via the network computer;
   receiving, by the server computer, the authorization response message; and
   transmitting, by the server computer, the authorization response message to the resource provider computer.

7. The method of claim 6 further comprising:
   after transmitting the authorization response message, receiving, by the server computer, resource details associated with the resource identifier from the resource provider computer; and
   storing, by the server computer, the resource details in an asset inventory associated with the user identifier.

8. The method of claim 1 further comprising:
   evaluating, by the server computer, compliance rules related to the interaction data and/or the set of user attributes.

9. A server computer comprising:
   a processor;
   a memory device; and
   a computer-readable medium coupled to the processor, the computer-readable medium comprising code executable by the processor for implementing a method comprising:
   receiving, by an interaction module of the server computer from a resource provider computer, interaction data comprising a user identifier, a resource provider identifier, and a resource identifier, wherein the interaction data is associated with an interaction between a resource provider and a user;

determining, by a resource configuration module of the server computer, a set of attribute types specifically associated with the resource provider identifier and the resource identifier;

determining, by the interaction module of the server computer and using the user identifier, a set of user attributes associated with the set of attribute types;

determining, by the interaction module of the server computer, a set of missing user attributes not stored in an attribute database;

transmitting, by the interaction module of the server computer to a user device associated with the user identifier, a missing attribute request message comprising the set of missing user attributes;

receiving, by the interaction module of the server computer from the user device, a missing attribute response message comprising missing user attributes;

storing, a profile management module of the server computer, the missing user attributes in the attribute database;

executing, by the interaction module of the server computer, a query comprising one or more questions on the set of user attributes and the stored missing user attributes to determine if the one or more questions are satisfied; and in response to the one or more questions being satisfied, then performing by the interaction module of the server computer, additional processing associated with the interaction.

10. The server computer of claim 9, wherein the one or more questions are privacy preserving questions, and answers to the questions are provided to the resource provider computer.

11. The server computer of claim 9, wherein the set of attribute types are in a user permissions database, the user permissions database storing a plurality of attribute type sets, each attribute type set being associated with a permission level identified by the user.

12. The server computer of claim 9, wherein the set of attribute types is stored in the attribute database which stores specific sets of attribute types that are associated with resources, the resources being associated with specific resource providers using resource identifiers and resource provider identifiers.

13. The server computer of claim 9, wherein the one or more questions are associated with the set of attribute types specifically associated with the resource provider identifier and the resource identifier.

14. The server computer of claim 9, wherein the additional processing further comprises:

generating an authorization request message comprising the interaction data;

transmitting the authorization request message to a network computer, wherein the network computer routes the authorization request message to an authorizing entity computer, wherein the authorizing entity computer determines whether or not to authorize the interaction, generates an authorization response message, and transmits the authorization response message to the server computer via the network computer;

receiving the authorization response message; and transmitting the authorization response message to the resource provider computer.

15. The server computer of claim 14, wherein the method further comprises:

after transmitting the authorization response message, receiving resource details associated with the resource identifier from the resource provider computer; and storing the resource details in an asset inventory associated with the user identifier.

16. The server computer of claim 9, wherein the method further comprises:

evaluating compliance rules related to the interaction data and/or the set of user attributes.

* * * * *